(12) United States Patent
Okumura et al.

(10) Patent No.: US 9,831,676 B2
(45) Date of Patent: Nov. 28, 2017

(54) POWER CONVERSION DEVICE AND THREE-PHASE AC POWER SUPPLY DEVICE

(71) Applicant: Sumitomo Electric Industries, Ltd., Osaka-shi (JP)

(72) Inventors: Toshiaki Okumura, Osaka (JP); Naoki Ayai, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/312,151

(22) PCT Filed: Mar. 11, 2015

(86) PCT No.: PCT/JP2015/057107
§ 371 (c)(1),
(2) Date: Nov. 17, 2016

(87) PCT Pub. No.: WO2015/182211
PCT Pub. Date: Dec. 3, 2015

(65) Prior Publication Data
US 2017/0104422 A1 Apr. 13, 2017

(30) Foreign Application Priority Data
May 29, 2014 (JP) ................................ 2014-111349

(51) Int. Cl.
*H02J 1/10* (2006.01)
*H02J 3/38* (2006.01)
(Continued)

(52) U.S. Cl.
CPC .............. *H02J 3/38* (2013.01); *H02J 3/46* (2013.01); *H02M 7/487* (2013.01)

(58) Field of Classification Search
CPC ...... H02J 1/102; H02J 1/12; H02J 3/38; H02J 3/46; Y10T 307/707; H02M 3/1584;
(Continued)

(56) References Cited

U.S. PATENT DOCUMENTS 5,889,661 A 3/1999 Tamura et al.
2010/0244575 A1* 9/2010 Coccia .................... H02J 3/383
307/82
(Continued)

FOREIGN PATENT DOCUMENTS

JP 10-84679 A 3/1998
JP 10-257781 A 9/1998
(Continued)

OTHER PUBLICATIONS

International Search Report in counterpart International Application No. PCT/JP2015/057107, dated Jun. 2, 2015.

*Primary Examiner* — Nguyen Tran
(74) *Attorney, Agent, or Firm* — Venable LLP; Michael A. Sartori; Miguel A. Lopez

(57) ABSTRACT

A power conversion device includes: a conversion device for each phase which converts DC voltage inputted from a DC power supply, to voltage having an AC waveform to be outputted to each phase with respect to a neutral point of three-phase AC; and a control unit which controls these conversion devices. Each conversion device includes: a first conversion unit which has a DC/DC converter including an isolation transformer, and a capacitor, and which converts the inputted DC voltage to voltage containing a pulsating-current waveform corresponding to the absolute value of voltage obtained by superimposing a third-order harmonic on a fundamental wave as the AC waveform to be outputted; and a second conversion unit which has a full-bridge inverter for inverting the polarity of the voltage containing the pulsating-current waveform, per one cycle, thereby converting the voltage to voltage having the AC waveform.

9 Claims, 25 Drawing Sheets

(51) Int. Cl.
*H02M 7/487* (2007.01)
*H02J 3/46* (2006.01)

(58) Field of Classification Search
CPC ........ H02M 3/285; H02M 7/49; H02M 1/088;
H02M 7/153; H02M 7/08; H02M 7/17;
H02M 7/493; H02M 7/5381
USPC ................ 363/65, 68–69, 71–72; 307/82–84
See application file for complete search history.

(56) References Cited

U.S. PATENT DOCUMENTS

2013/0343089 A1* 12/2013 Gupta ................ H02M 7/4807
363/16
2016/0372926 A1* 12/2016 Pahlevaninezhad .... H02J 3/382

FOREIGN PATENT DOCUMENTS

| JP | 2006-149074 A | 6/2006 |
| JP | 5260092 B2 | 8/2013 |
| WO | 2010/111433 A2 | 9/2010 |

\* cited by examiner

FIG. 8
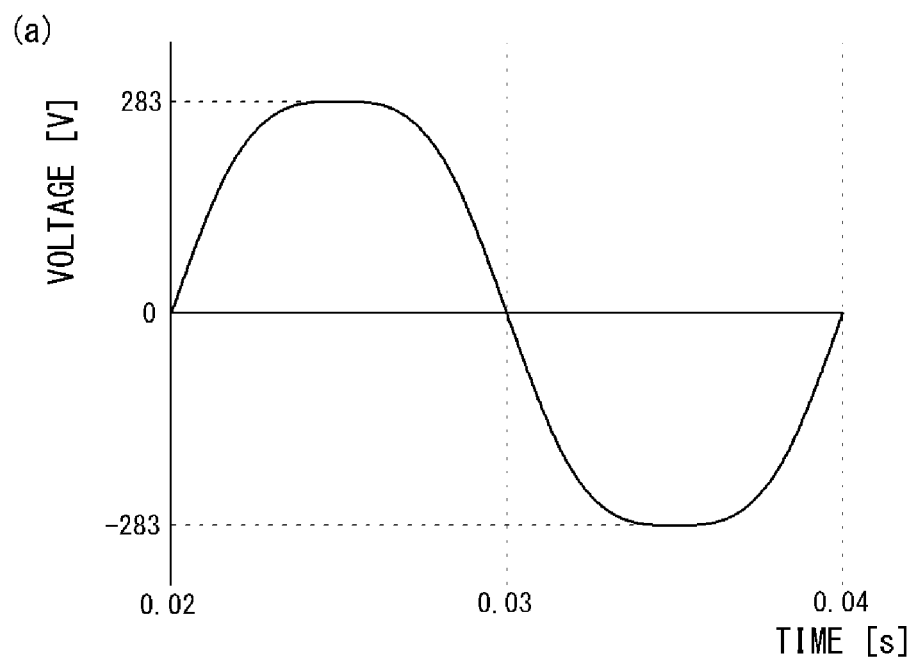
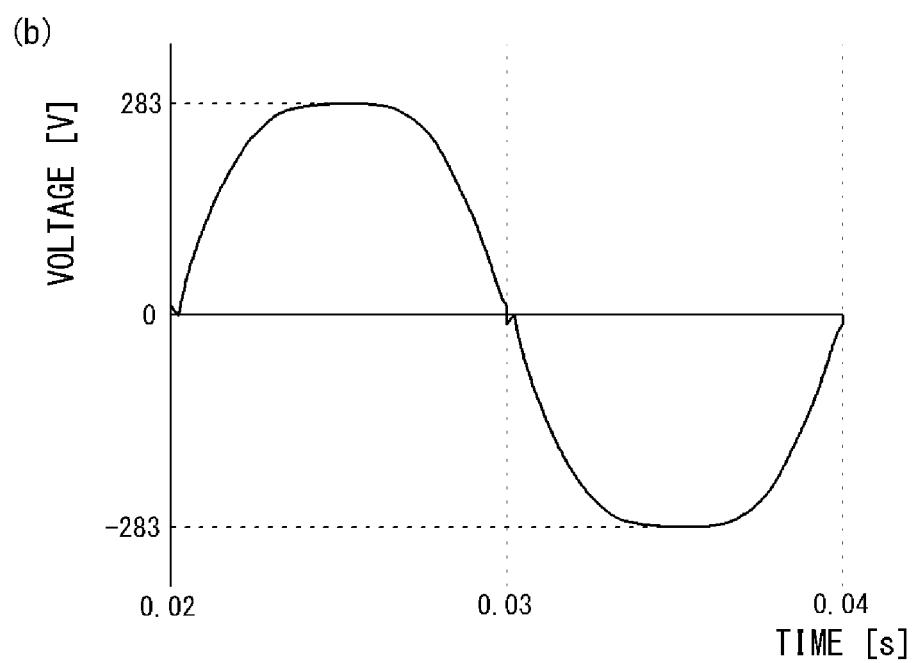

FIG. 9
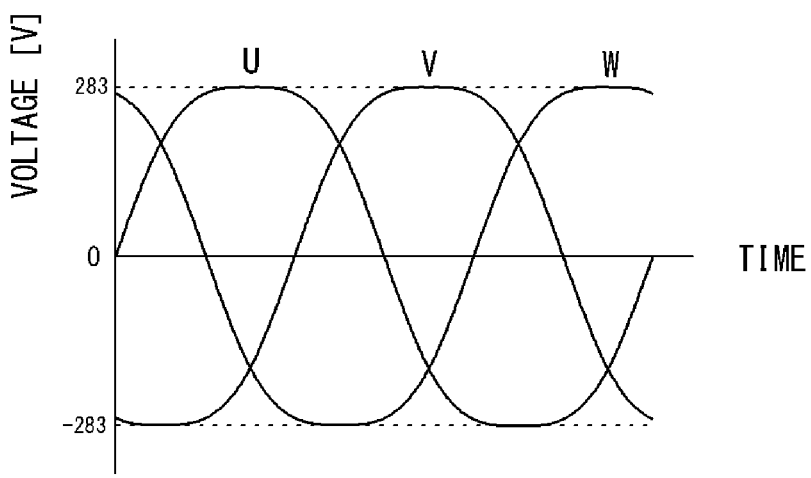
(a)
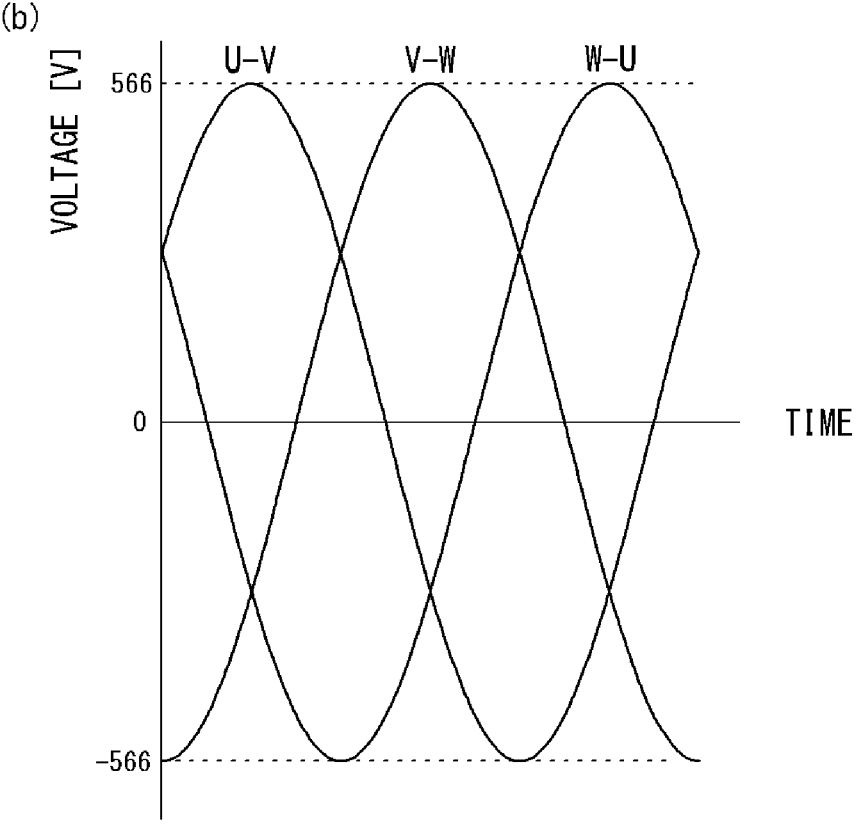
(b)

FIG. 13
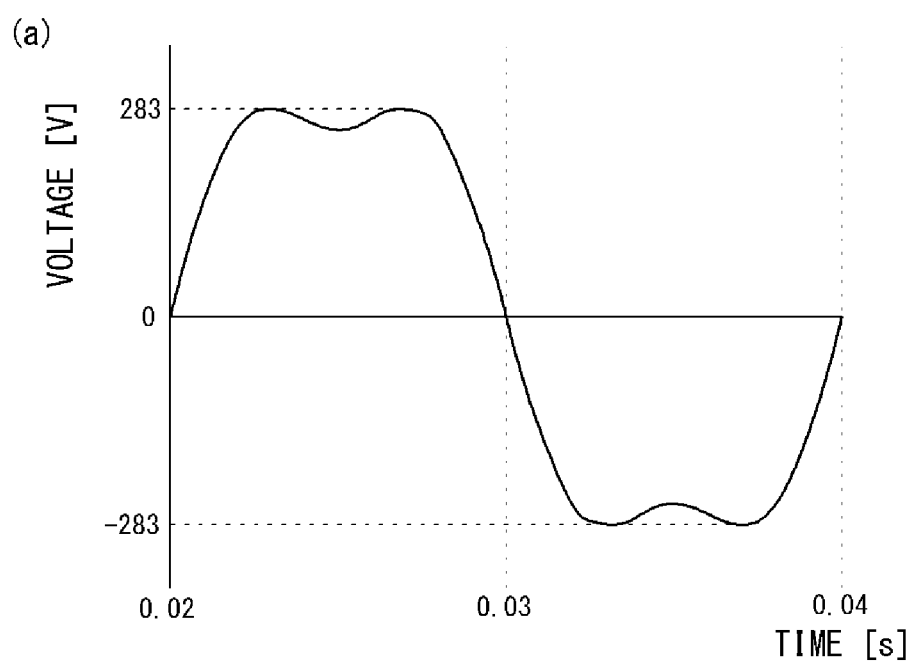
(a)
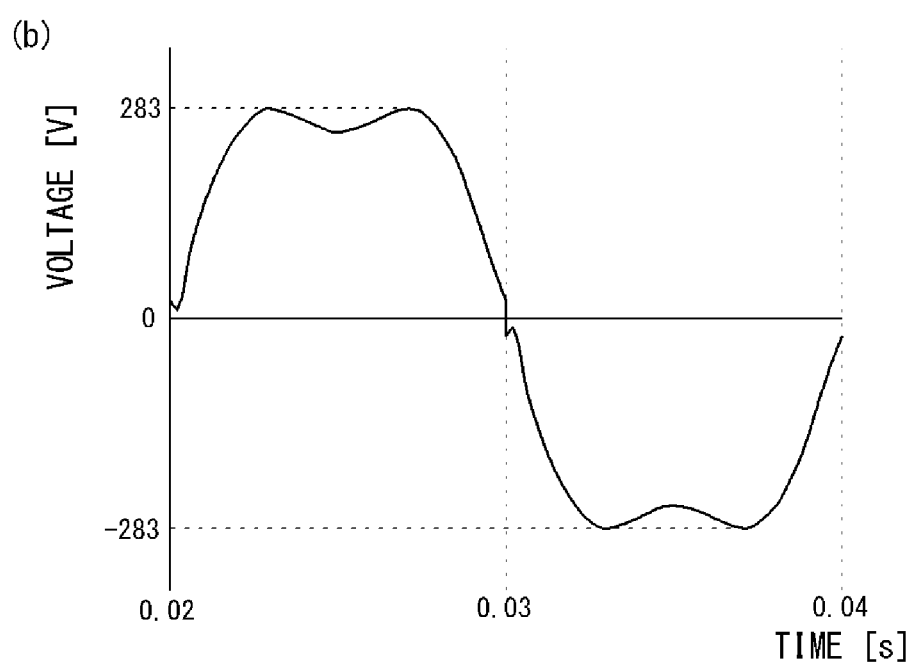
(b)

FIG. 14
(a)
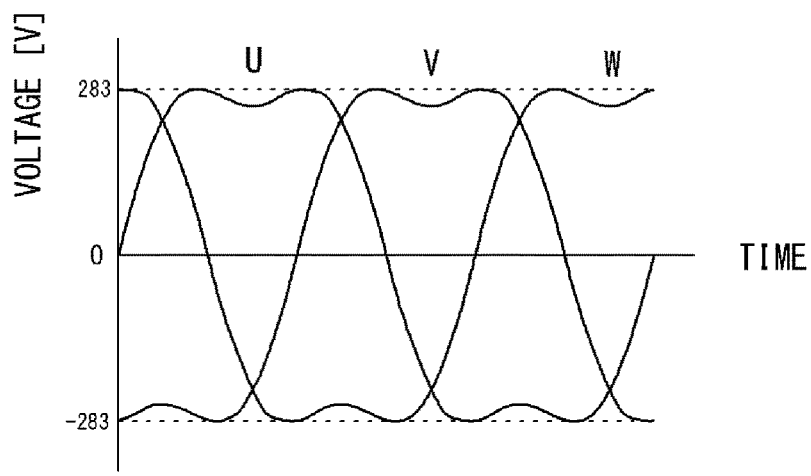
(b)
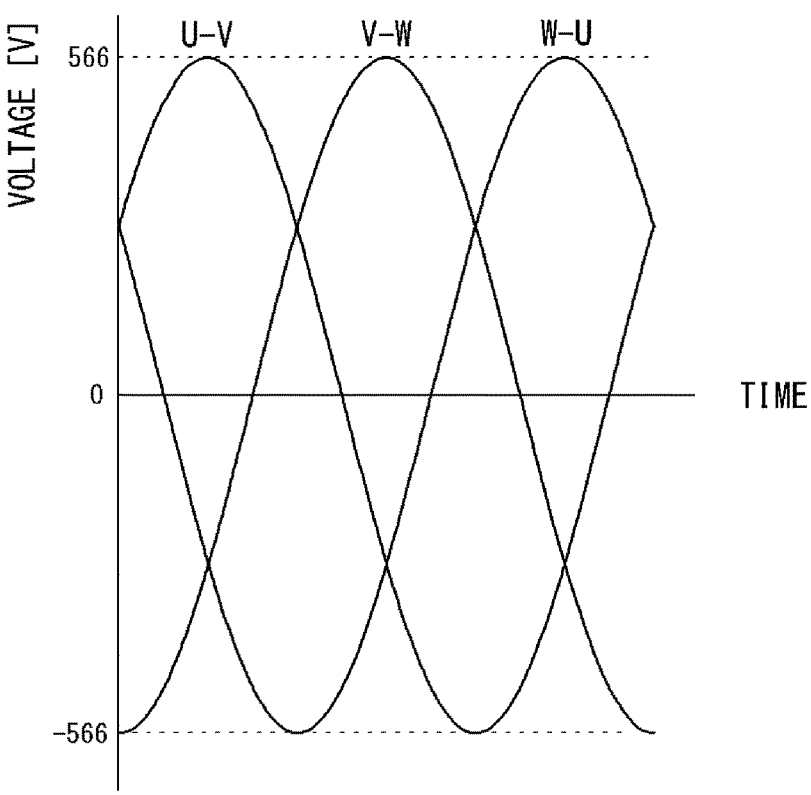

POWER CONVERSION DEVICE AND THREE-PHASE AC POWER SUPPLY DEVICE

TECHNICAL FIELD

The present invention relates to a three-phase AC power supply device for generating three-phase AC power from DC power, and to a power conversion device used therefor.

BACKGROUND ART

Power conversion devices that step up DC voltage inputted from a DC power supply by a DC/DC converter, convert the resultant voltage to AC voltage by an inverter, and output the AC voltage, are often used for a stand-alone power supply, a UPS (Uninterruptible Power Supply), and the like. In such a power conversion device, the DC/DC converter constantly performs switching operation, and the inverter also constantly performs switching operation.

Also, by using a three-phase inverter, voltage of the DC power supply can be converted to three-phase AC voltage (for example, see Patent Literature 1 (FIG. 7)).

FIG. 25 is an example of a circuit diagram of a power conversion device used in a case of supplying power from a DC power supply to a three-phase AC load. In FIG. 25, a power conversion device 200 generates AC power on the basis of DC power received from a DC power supply 201, and supplies the power to a three-phase AC load 220.

The power conversion device 200 includes: a capacitor 202; for example, three step-up circuits 203; a smoothing circuit 205 for smoothing voltage of a DC bus 204; a three-phase inverter circuit 207; and three pairs of AC reactors 208 to 210 and capacitors 211 to 213. The smoothing circuit 205 is formed by connecting two capacitors 206 in series for the purpose of obtaining the withstand voltage property and connecting six sets of such two capacitors 206 in parallel for the purpose of obtaining the capacitance. The capacitance of the smoothing circuit as a whole is several mF, for example.

The step-up circuit 203 steps up voltage which has been caused to have a high frequency through switching, by an isolation transformer 203t, and then rectifies the stepped-up voltage. The three step-up circuits 203 are connected in parallel to the common DC bus 204. The outputs of the three step-up circuits 203 are smoothed by the smoothing circuit 205 having a large capacitance, to become the voltage of the DC bus 204. This voltage is subjected to switching by the three-phase inverter circuit 207, thereby generating three-phase AC voltage including a high-frequency component. The high-frequency component is removed by the AC reactors 208 to 210 and the capacitors 211 to 213, whereby three-phase AC voltage (power) that can be provided to the three-phase AC load 220 is obtained. The line-to-line voltage of the three-phase AC load 220 is 400V.

Here, the voltage of the DC bus 204 is required to be equal to or higher than the wave crest value of AC 400V, which is 400×($2^{1/2}$), i.e., about 566V, but is set at 600V, considering some margin. In a case where the voltage of the DC bus 204 is 600V, when a switching element in the three-phase inverter circuit 207 is turned off, due to resonance by a floating inductance and the capacitance of the switching element, voltage that greatly exceeds 600V is applied to the switching element. Therefore, in order to reliably prevent insulation breakdown of the switching element, for example, withstand voltage property of 1200V which is twice as high as the voltage of the DC bus is required. In addition, the withstand voltage property of 1200V is also required for the smoothing circuit 205, and in the configuration in FIG. 25, withstand voltage property of 600V is required for each capacitor.

CITATION LIST

Patent Literature

PATENT LITERATURE 1: Japanese Patent No. 5260092

SUMMARY OF INVENTION

Technical Problem

In the conventional power conversion device as described above, further improvement in the conversion efficiency is required. In order to improve the conversion efficiency, it is effective to reduce switching loss. In general, the higher the voltage of the DC bus is, the greater the switching loss and the like are. Therefore, how to reduce the voltage of the DC bus is a problem. In addition, it is desired to reduce the switching loss and other power losses also by means other than the reduction in the voltage.

In view of the above problems, an object of the present invention is to reduce power loss due to conversion in a three-phase AC power supply device for converting DC voltage inputted from a DC power supply to three-phase AC voltage, and in a power conversion device used therefor.

Solution to Problem

The present invention provides a power conversion device for converting DC voltage inputted from a DC power supply, to three-phase AC voltage, the power conversion device including: a first-phase conversion device configured to convert the DC voltage inputted from the DC power supply, to voltage having an AC waveform to be outputted to a first phase with respect to a neutral point of three-phase AC; a second-phase conversion device configured to convert the DC voltage inputted from the DC power supply, to voltage having an AC waveform to be outputted to a second phase with respect to the neutral point; a third-phase conversion device configured to convert the DC voltage inputted from the DC power supply, to voltage having an AC waveform to be outputted to a third phase with respect to the neutral point; and a control unit configured to control the first-phase conversion device, the second-phase conversion device, and the third-phase conversion device, wherein each of the first-phase conversion device, the second-phase conversion device, and the third-phase conversion device includes: a first conversion unit having a DC/DC converter including an isolation transformer, and a smoothing capacitor, the first conversion unit being configured to, by the control unit controlling the DC/DC converter, convert the inputted DC voltage to voltage containing a pulsating-current waveform corresponding to an absolute value of voltage obtained by superimposing a third-order harmonic on a fundamental wave as the AC waveform to be outputted; and a second conversion unit provided at a stage subsequent to the first conversion unit and having a full-bridge inverter, the second conversion unit being configured to, by the control unit controlling the full-bridge inverter, invert a polarity of the voltage containing the pulsating-current waveform, per one cycle, thereby converting the voltage to voltage having the AC waveform.

In addition, the present invention provides a three-phase AC power supply device including: a DC power supply; a first-phase conversion device configured to convert DC voltage inputted from the DC power supply, to voltage having an AC waveform to be outputted to a first phase with respect to a neutral point of three-phase AC; a second-phase conversion device configured to convert DC voltage inputted from the DC power supply, to voltage having an AC waveform to be outputted to a second phase with respect to the neutral point; a third-phase conversion device configured to convert DC voltage inputted from the DC power supply, to voltage having an AC waveform to be outputted to a third phase with respect to the neutral point; and a control unit configured to control the first-phase conversion device, the second-phase conversion device, and the third-phase conversion device, wherein each of the first-phase conversion device, the second-phase conversion device, and the third-phase conversion device includes: a first conversion unit having a DC/DC converter including an isolation transformer, and a smoothing capacitor, the first conversion unit being configured to, by the control unit controlling the DC/DC converter, convert the inputted DC voltage to voltage containing a pulsating-current waveform corresponding to an absolute value of voltage obtained by superimposing a third-order harmonic on a fundamental wave as the AC waveform to be outputted; and a second conversion unit provided at a stage subsequent to the first conversion unit and having a full-bridge inverter, the second conversion unit being configured to, by the control unit controlling the full-bridge inverter, invert a polarity of the voltage containing the pulsating-current waveform, per one cycle, thereby converting the voltage to voltage having the AC waveform.

Advantageous Effects of Invention

The power conversion device and the three-phase AC power supply device of the present invention enable reduction in power loss due to conversion.

BRIEF DESCRIPTION OF DRAWINGS

FIG. 8 is graphs showing outputted AC voltage $V_{AC}$ in which (a) shows target voltage (ideal value), and (b) shows AC voltage $V_{AC}$ actually detected by a voltage sensor.

FIG. 9 is a waveform diagram in which (a) shows phase voltages for U, V, W outputted from the power conversion device, and (b) shows line-to-line voltages for U-V, V-W, W-U applied to a three-phase AC load.

FIG. 13 is graphs showing outputted AC voltage $V_{AC}$ in which (a) shows target voltage (ideal value), and (b) shows AC voltage $V_{AC}$ actually detected by the voltage sensor.

FIG. 14 is a waveform diagram in which (a) shows phase voltages for U, V, W outputted from the power conversion device, and (b) shows line-to-line voltages for U-V, V-W, W-U applied to the three-phase AC load.

DESCRIPTION OF EMBODIMENTS

Summary of Embodiments

Figure 1:
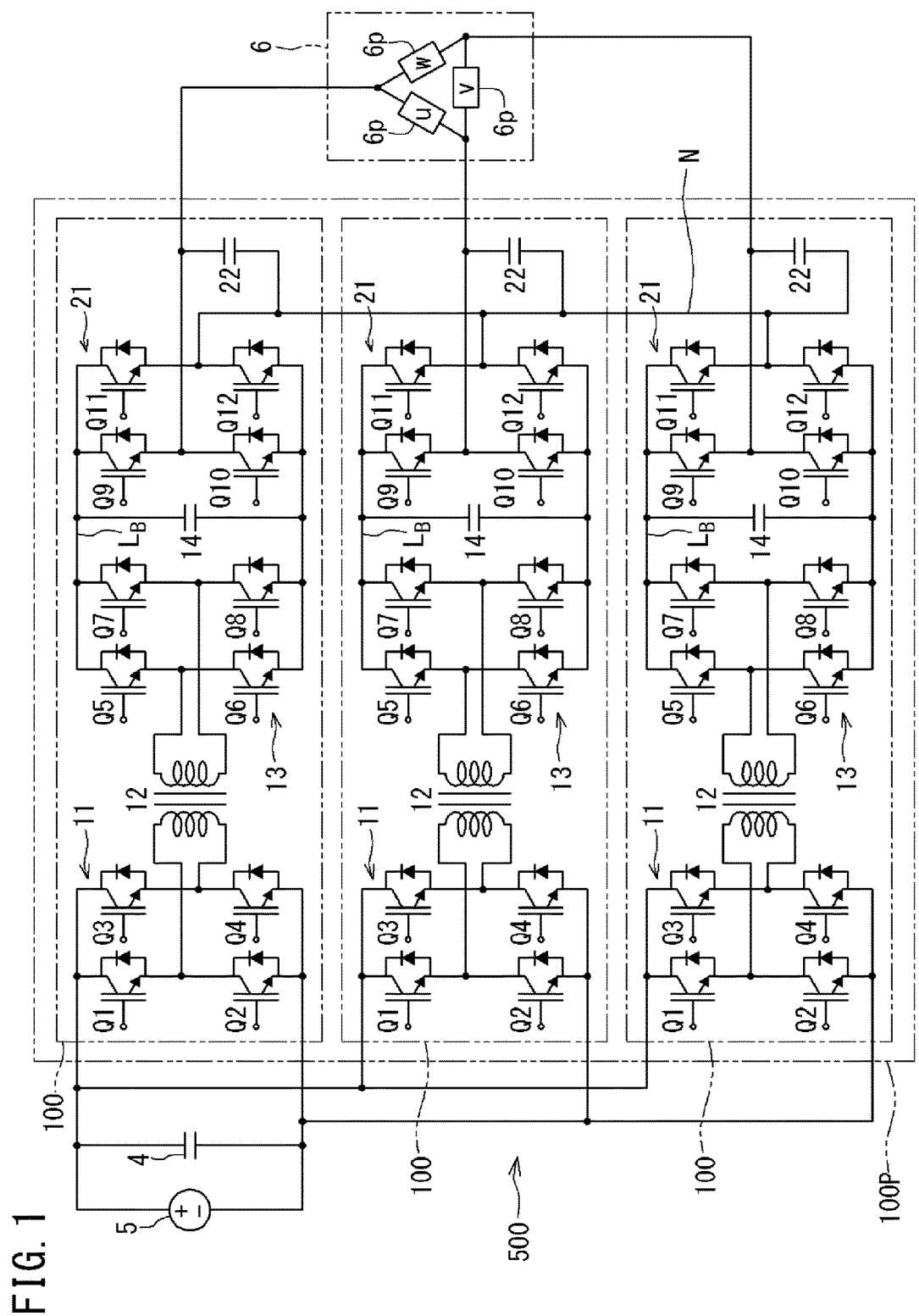
FIG. 1 is a circuit diagram showing a three-phase AC power supply device according to the first embodiment.

Summary of the embodiments of the present invention includes at least the following.

(1) This is a power conversion device for converting DC voltage inputted from a DC power supply, to three-phase AC voltage, the power conversion device including: a first-phase conversion device configured to convert the DC voltage inputted from the DC power supply, to voltage having an AC waveform to be outputted to a first phase with respect to a neutral point of three-phase AC; a second-phase conversion device configured to convert the DC voltage inputted from the DC power supply, to voltage having an AC waveform to be outputted to a second phase with respect to the neutral point; a third-phase conversion device configured to convert the DC voltage inputted from the DC power supply, to voltage having an AC waveform to be outputted to a third phase with respect to the neutral point; and a control unit configured to control the first-phase conversion device, the second-phase conversion device, and the third-phase conversion device, wherein each of the first-phase conversion device, the second-phase conversion device, and the third-phase conversion device includes: a first conversion unit having a DC/DC converter including an isolation transformer, and a smoothing capacitor, the first conversion unit being configured to, by the control unit controlling the DC/DC converter, convert the inputted DC voltage to voltage containing a pulsating-current waveform corresponding to an absolute value of voltage obtained by superimposing a third-order harmonic on a fundamental wave as the AC waveform to be outputted; and a second conversion unit provided at a stage subsequent to the first conversion unit and having a full-bridge inverter, the second conversion unit being configured to, by the control unit controlling the full-bridge inverter, invert a polarity of the voltage containing the pulsating-current waveform, per one cycle, thereby converting the voltage to voltage having the AC waveform.

In the power conversion device of the above (1), since the conversion devices (first phase, second phase, third phase) are provided for the respective phases and output the phase voltages, voltage $V_{AC}$ (effective value) to be outputted from each conversion device is $1/(3^{1/2})$ of the line-to-line voltage of the three-phase AC. For voltage $V_B$ of a DC bus, the wave crest value of the voltage $V_{AC}$ is sufficient, i.e., $V_B = (2^{1/2}) \cdot V_{AC}$. As a result, the voltage of the DC bus is reduced as compared to a case where the line-to-line voltage is supplied by a single three-phase inverter. In addition, owing to the effect of reducing the wave crest value by superimposition of the third-order harmonic, the voltage of the DC bus is further reduced.

Owing to voltage reduction in the DC bus, switching loss in the switching elements is reduced. In addition, even in a case where a reactor is provided in the device, iron loss thereof is reduced. Further, for the switching elements and the smoothing capacitor connected to the DC bus, even the ones having low withstand voltage properties can be used. Since a switching element having a lower withstand voltage property has a lower ON resistance, conduction loss can be reduced.

In the power conversion device as described above, although the hardware configuration of the first conversion unit is a DC/DC converter, the DC voltage is converted to, not mere DC voltage, but voltage containing a pulsating-current waveform corresponding to the absolute value of the AC waveform. Thus, a waveform as a base of the AC waveform is generated by the first conversion unit. Then, the second conversion unit inverts the polarity of the voltage containing the pulsating-current waveform, per one cycle, thereby converting the voltage to the target voltage of the AC waveform. The number of times of switching in the full-bridge inverter of the second conversion unit in this case is dramatically decreased as compared to that in the conventional inverter operation, and voltage at the time of the switching is low. Therefore, switching loss in the second conversion unit is greatly reduced. Even in a case where a reactor is provided in the second conversion unit, iron loss thereof is reduced. Further, the capacitor of the first conversion unit smoothes only high-frequency voltage variation but does not smooth the pulsating-current waveform having a low frequency. Therefore, it is possible to use a capacitor with a low capacitance.

(2) In the power conversion device of (1), the first conversion unit may convert the DC voltage to voltage having the pulsating-current waveform consecutively.

In this case, the waveform with a half cycle as a base of the AC waveform is entirely generated by the first conversion unit, and the second conversion unit only performs polarity inversion at a frequency twice as high as the frequency of the AC waveform to be outputted. That is, the second conversion unit does not perform inverter operation accompanied by high-frequency switching. Therefore, an AC reactor is not needed on the output side of the second conversion unit, and thus loss due to the AC reactor can be eliminated.

(3) In the power conversion device of (1), during a period in which the voltage outputted from the first conversion unit is equal to or lower than a predetermined proportion of a wave crest value of the pulsating-current waveform, the control unit may cause the full-bridge inverter to perform inverter operation at a high frequency, thereby generating voltage having the AC waveform in the period.

The period during which the voltage is equal to or lower than a predetermined proportion of the wave crest value of the pulsating-current waveform means the vicinity of zero cross of the target voltage. That is, in this case, in the vicinity of zero cross of the target voltage, the second conversion unit contributes to generation of the AC waveform, and in the other region, the first conversion unit contributes to generation of the AC waveform. In a case where a pulsating-current waveform in the entire region is generated by only the first conversion unit, the waveform in the vicinity of zero cross might be distorted. However, by locally using inverter operation of the second conversion unit, such distortion of the waveform is prevented, and output of a smoother AC waveform can be obtained. Since the period during which the second conversion unit is caused to perform inverter operation is short, loss is smaller than in the conventional inverter operation. In addition, loss due to the AC reactor is also smaller.

(4) The predetermined proportion in (3) is preferably 18% to 35%.

In this case, it is possible to prevent distortion of the waveform in the vicinity of zero cross, and sufficiently obtain the effect of loss reduction. For example, if the "predetermined proportion" is lower than 18%, there is a possibility that slight distortion is left in the vicinity of zero cross. If the "predetermined proportion" is higher than 35%, the period during which the second conversion unit 2 performs high-frequency inverter operation is prolonged, and the effect of loss reduction is reduced by an amount corresponding to the prolonged period.

(5) In the power conversion device of any one of (1) to (4), preferably, the capacitor has such a capacitance that allows high-frequency voltage variation due to switching in the first conversion unit to be smoothed but does not allow the pulsating-current waveform to be smoothed.

In this case, it is possible to obtain a desired pulsating-current waveform while eliminating high-frequency voltage variation due to switching.

(6) On the other hand, a three-phase AC power supply device includes: a DC power supply; a first-phase conversion device configured to convert DC voltage inputted from the DC power supply, to voltage having an AC waveform to be outputted to a first phase with respect to a neutral point of three-phase AC; a second-phase conversion device configured to convert DC voltage inputted from the DC power supply, to voltage having an AC waveform to be outputted to a second phase with respect to the neutral point; a third-phase conversion device configured to convert DC voltage inputted from the DC power supply, to voltage having an AC waveform to be outputted to a third phase with respect to the neutral point; and a control unit configured to control the first-phase conversion device, the second-phase conversion device, and the third-phase conversion device, wherein each of the first-phase conversion device, the second-phase conversion device, and the third-phase conversion device includes: a first conversion unit having a DC/DC converter including an isolation transformer, and a smoothing capacitor, the first conversion unit being configured to, by the control unit controlling the DC/DC converter, convert the inputted DC voltage to voltage containing a pulsating-current waveform corresponding to an absolute value of voltage obtained by superimposing a third-order harmonic on a fundamental wave as the AC waveform to be outputted; and a second conversion unit provided at a stage subsequent to the first conversion unit and having a full-bridge inverter, the second conversion unit being configured to, by the control unit controlling the full-bridge inverter, invert a polarity of the voltage containing the pulsating-current waveform, per one cycle, thereby converting the voltage to voltage having the AC waveform.

Also in this case, the same operation and effect as in the power conversion device of (1) are provided.

Details of Embodiments

Hereinafter, embodiments of the present invention will be described in detail with reference to the drawings.

First Embodiment of Three-Phase AC Power Supply Device/Power Conversion Device (Three-Phase Circuit Diagram)

FIG. 1 is a circuit diagram showing a three-phase AC power supply device 500 according to the first embodiment. The three-phase AC power supply device 500 includes a power conversion device 100P, and a DC power supply 5 composed of, for example, a storage battery, and is connected to a three-phase AC load 6.

The power conversion device 100P is composed of three conversion devices (first conversion device, second conversion device, third conversion device) 100 provided for the respective phases of the three-phase AC. The conversion device 100 converts DC power inputted from the DC power supply 5, to AC power, and supplies the AC power to the three-phase AC load 6. The three conversion devices 100 each supply AC power with the phase voltage with respect to a neutral point N of the three-phase AC, and the three conversion devices 100 as a whole supply AC power with line-to-line voltage to respective phase loads 6p (first phase (u), second phase (v), third phase (w)).

In a case where the line-to-line voltage of the three-phase AC load 6 is 400V, the phase voltage is about 231V (400V/($3^{1/2}$)).)) Each conversion device 100 that outputs the phase voltage requires about 327V ((400V/($3^{1/2}$))×($2^{1/2}$)) as the voltage of a DC bus $L_B$. This means that the voltage of the DC bus $L_B$ is reduced (from 566V to 327V) as compared to a case where the line-to-line voltage (400V) to the three-phase AC load 6 is supplied by a single three-phase inverter. Therefore, the withstand voltage properties of switching elements and other electronic devices do not require 1200V, but about 600V is sufficient.

(Single-Phase Circuit Diagram)

Figure 2:
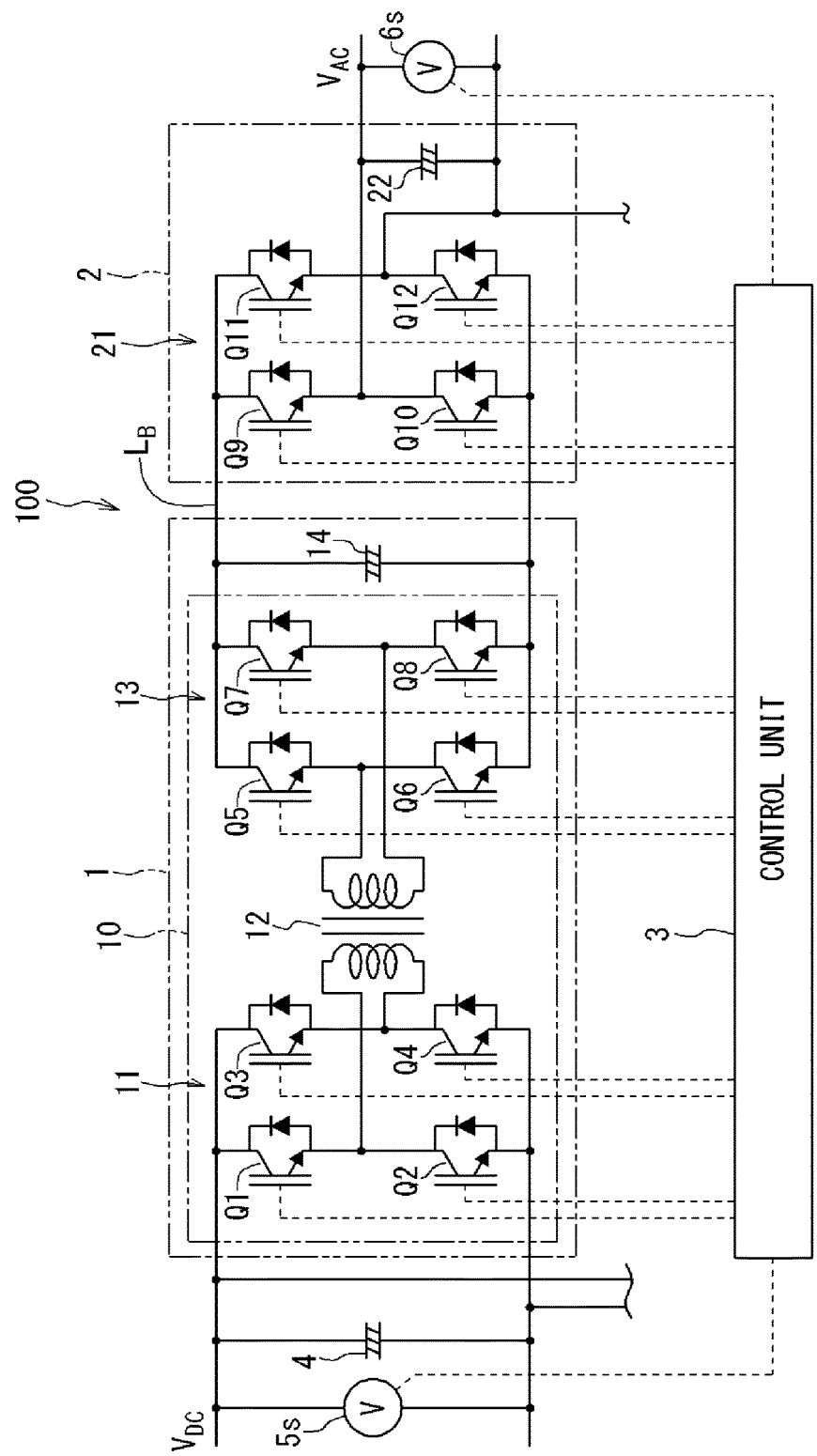
FIG. 2 is a diagram showing in more detail an internal circuit of a conversion device for one phase in FIG. 1.

FIG. 2 is a diagram showing in more detail an internal circuit of the conversion device 100 for one phase in FIG. 1.

The conversion device 100 converts inputted DC voltage $V_{DC}$ to AC voltage $V_{AC}$ corresponding to target voltage for the AC waveform, and outputs the AC voltage $V_{AC}$. Although the conversion device 100 is also capable of conversion from AC to DC, here, the description will be given mainly focusing on conversion from DC to AC (the same applies also in the second embodiment and the third embodiment).

In FIG. 2, the conversion device 100 includes, as main components, a first conversion unit 1, a second conversion unit 2, and a control unit 3. The first conversion unit 1 receives the DC voltage $V_{DC}$ via a smoothing capacitor 4. The DC voltage $V_{DC}$ is detected by a voltage sensor 5s, and information about the detected voltage is sent to the control unit 3. The AC voltage $V_{AC}$ which is output voltage of the second conversion unit 2 is detected by a voltage sensor 6s, and information about the detected voltage is sent to the control unit 3.

The first conversion unit 1 includes a DC/DC converter 10 and a smoothing capacitor 14.

The DC/DC converter 10 includes, from the input side: a full-bridge circuit 11 composed of four switching elements Q1, Q2, Q3, Q4; an isolation transformer 12; and a rectification circuit 13 composed of four switching elements Q5, Q6, Q7, Q8, and these are connected as shown in FIG. 2.

The second conversion unit 2 includes: a full-bridge inverter 21 composed of four switching elements Q9, Q10, Q11, Q12; and a capacitor 22. Output of the second conversion unit 2 becomes the AC voltage $V_{AC}$ having a desired AC waveform.

The switching elements Q1 to Q12 are controlled by the control unit 3. As the switching elements Q1 to Q12, for example, IGBTs (Insulated Gate Bipolar Transistors) or FETs (Field Effect Transistors) may be used.

As described above, the voltage of the DC bus $L_B$ is reduced as compared to a case where the line-to-line voltage (400V) to the three-phase AC load 6 is supplied by a single three-phase inverter. Therefore, switching loss in the switching elements Q5 to Q12 in the conversion device 100 is reduced. In addition, iron loss in the isolation transformer 12 is also reduced.

Further, for the switching elements Q5 to Q12 and the smoothing capacitor 14 connected to the DC bus $L_B$, even the ones having low withstand voltage properties can be used. Since a switching element having a lower withstand voltage property has a lower ON resistance, conduction loss can be reduced.

(Operation of Conversion Device)
(First Example of Waveform)

Next, operation of the conversion device 100 will be described. First, the control unit 3 performs PWM control for the full-bridge circuit 11 (switching elements Q1 to Q4) of the first conversion unit 1.

Figure 3:
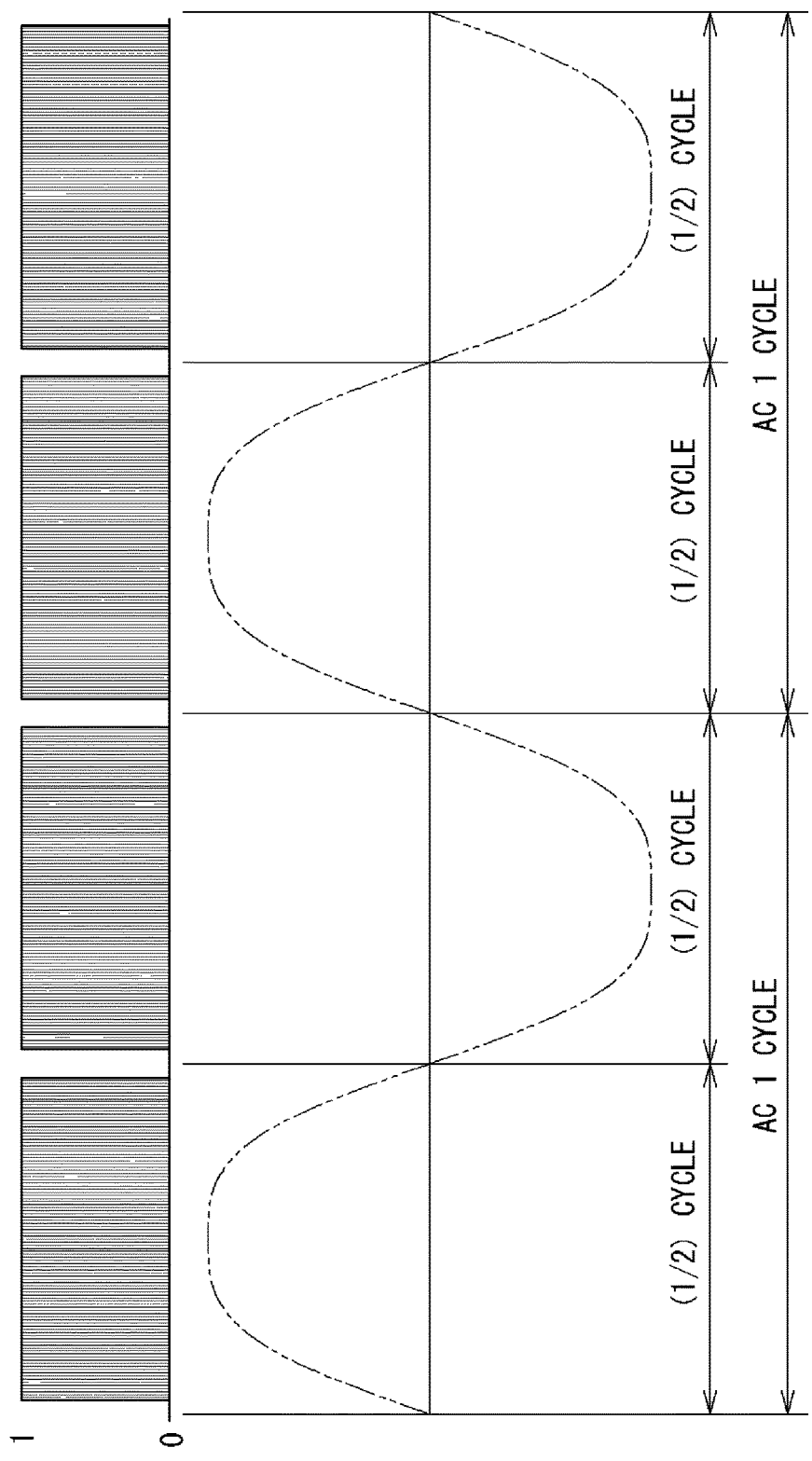
FIG. 3 is a diagram showing a gate drive pulse for a full-bridge circuit.

FIG. 3 is a diagram showing a gate drive pulse for the full-bridge circuit 11. In FIG. 3, a waveform indicated by a two-dot dashed line is AC voltage $V_{AC}$ corresponding to the target voltage. It is noted that, as described later, this waveform is not a normal sine wave. Since the frequency of the gate drive pulse is much higher (for example, 20 kHz) than the frequency (50 or 60 Hz) of the AC voltage $V_{AC}$, each pulse cannot be depicted, but the pulse width becomes the broadest at the peak of the absolute value of the AC waveform, and becomes narrower as the absolute value approaches zero.

Figure 4:
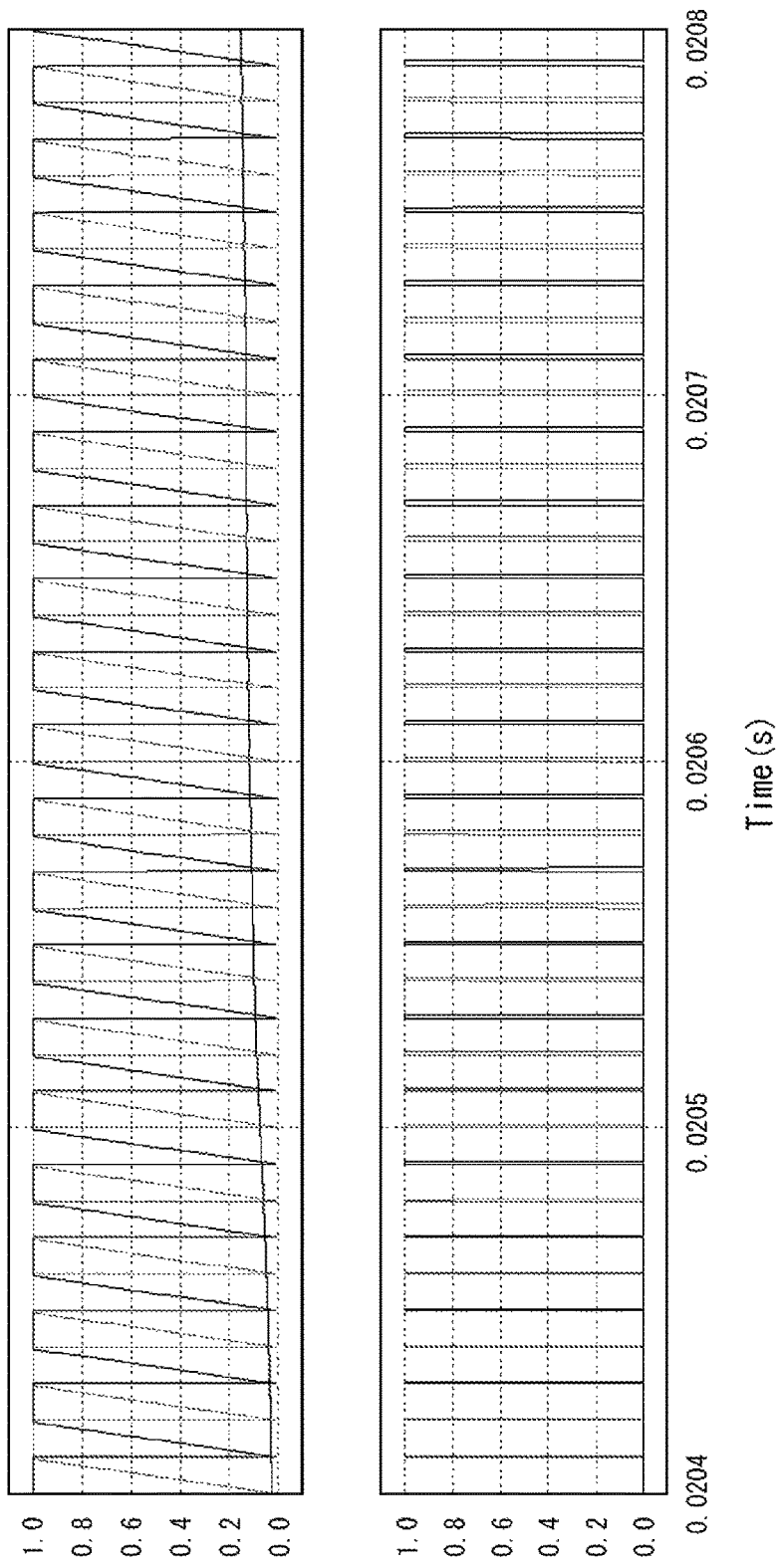
FIG. 4 is a diagram showing an example of the way of generating the gate drive pulse.

FIG. 4 is a diagram showing an example of the way of generating the gate drive pulse. The upper graph shows a high-frequency carrier wave and the absolute value of a sine wave of an AC waveform as a reference wave. Since the horizontal axis indicates very short times in an enlarged manner, the reference wave appears to be a straight line, but actually is a part rising from zero toward π/2, for example. As for the carrier wave, two waveforms (thick line and thin line) are shown in an overlapped manner, and they are two trapezoidal waveforms temporally shifted from each other by half cycle. That is, in one cycle of each trapezoidal waveform, the waveform obliquely rises and keeps the level one during a certain period, and then sharply falls to zero. Such a waveform arises consecutively, and two sets of such waveforms are shifted from each other by half cycle.

By comparing the carrier wave and the reference wave as described above, a pulse corresponding to an interval where the absolute value of the sine wave is greater than the carrier wave is generated, whereby a gate drive pulse subjected to PWM control is obtained as shown in the lower graph. Regarding the gate drive pulse, a pulse for turning on the switching elements Q1 and Q4 and a pulse for turning on the switching elements Q2 and Q3 are alternately outputted. Thus, positive voltage and negative voltage are alternately and equally applied to the primary winding of the isolation transformer 12. In the vicinity of zero cross of the reference wave (sine wave), a pulse width hardly arises, and therefore, as shown in FIG. 3, the vicinity of zero cross is substantially a region where no gate drive pulse is outputted.

The output of the full-bridge circuit 11 driven by the above gate drive pulse is transformed at a predetermined turn ratio by the isolation transformer 12, and thereafter, rectified by the rectification circuit 13 and smoothed by the capacitor 14. The smoothing acts to the extent that eliminates the trace of the high-frequency switching, but cannot smooth a low-frequency wave such as a commercial frequency. That is, the capacitance of the capacitor 14 is selected to be a proper value so as to obtain such a result. If the capacitance is much greater than the proper value, the low-frequency wave such as the commercial frequency is also smoothed, whereby the shape of the waveform is made vague. By selecting the proper value, it becomes possible to obtain a desired pulsating-current waveform while eliminating high-frequency voltage variation due to switching.

Even if the gate drive pulse is not given to the rectification circuit 13 from the control unit 3 (even if the switching elements Q5 to Q8 are all OFF), the rectification circuit 13 can perform rectification by diodes provided in the elements, but if the gate drive pulse is given, the rectification circuit 13 can perform synchronous rectification. That is, at the timing when current flows in each diode in a case of performing diode rectification, the gate drive pulses are given to the switching elements Q5 to Q8 from the control unit 3. This realizes synchronous rectification, and current flows through the semiconductor elements, whereby power loss in the rectification circuit 13 as a whole can be reduced.

Figure 5:
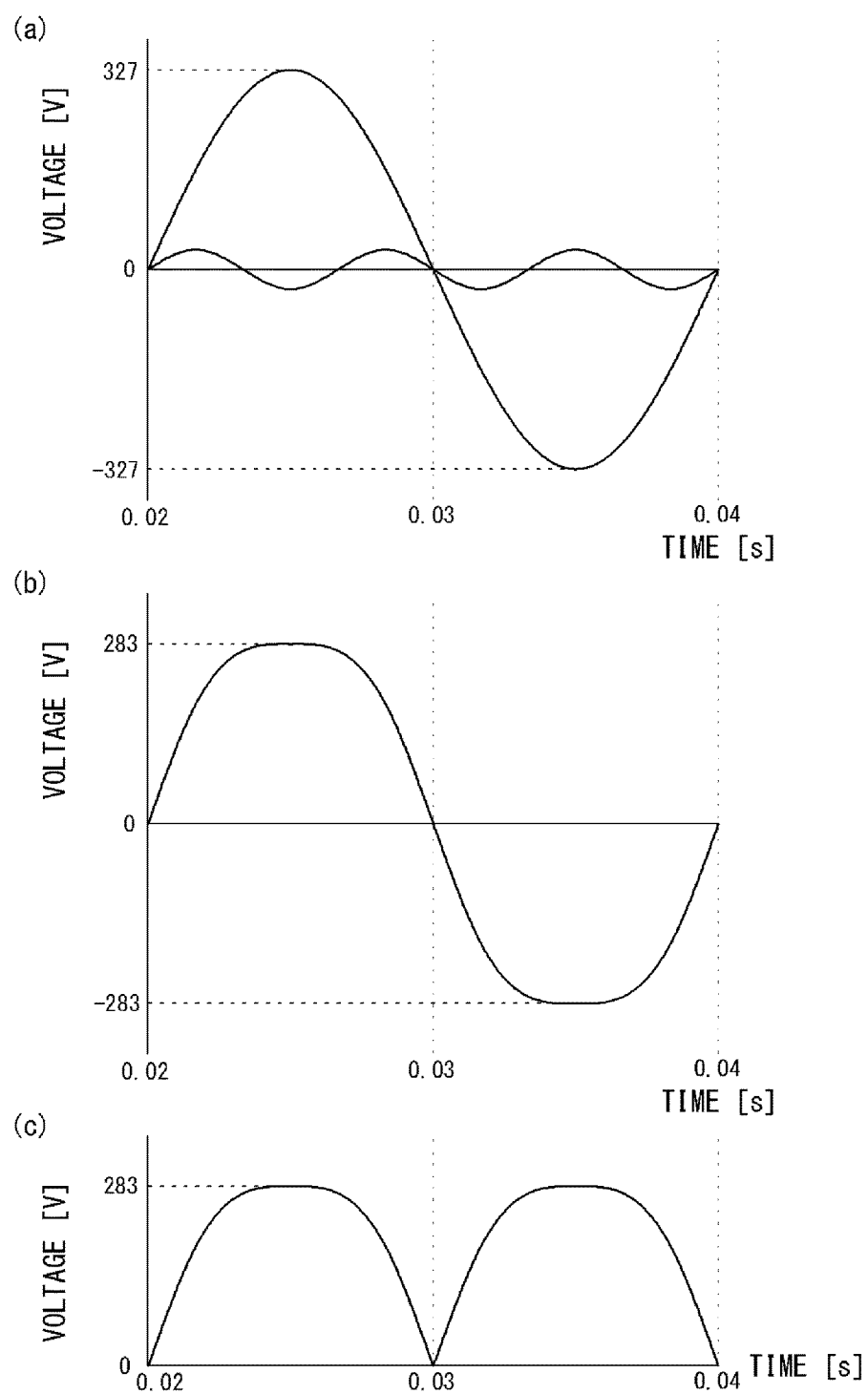
FIG. 5 is graphs showing the way of generating a command value for an output waveform in a first conversion unit.

FIG. 5 is graphs showing the way of generating a command value for the output waveform in the first conversion unit 1. The horizontal axis indicates time and the vertical axis indicates voltage. The waveform of the command value is obtained by using, as a fundamental wave, a sine wave having a wave crest value of 327V and a commercial frequency (50 Hz, 0.02 sec per cycle) as shown in (a), and superimposing, on the fundamental wave, a third-order harmonic having a frequency three times as high as that of the fundamental wave. The amplitude of the third-order harmonic is, for example, 10% of the amplitude of the fundamental wave. By superimposing the two waveforms, an AC waveform containing a third-order harmonic as shown in (b) is obtained. The peak value (wave crest value) of this AC wave becomes, due to its waveform, lower than that of the fundamental wave shown in (a), i.e., becomes 327×(3$^{1/2}$)/2=283 [V]. Then, the waveform of (c) which is the absolute value of the waveform of (b) becomes a command value for the output waveform of the first conversion unit 1.

Figure 6:
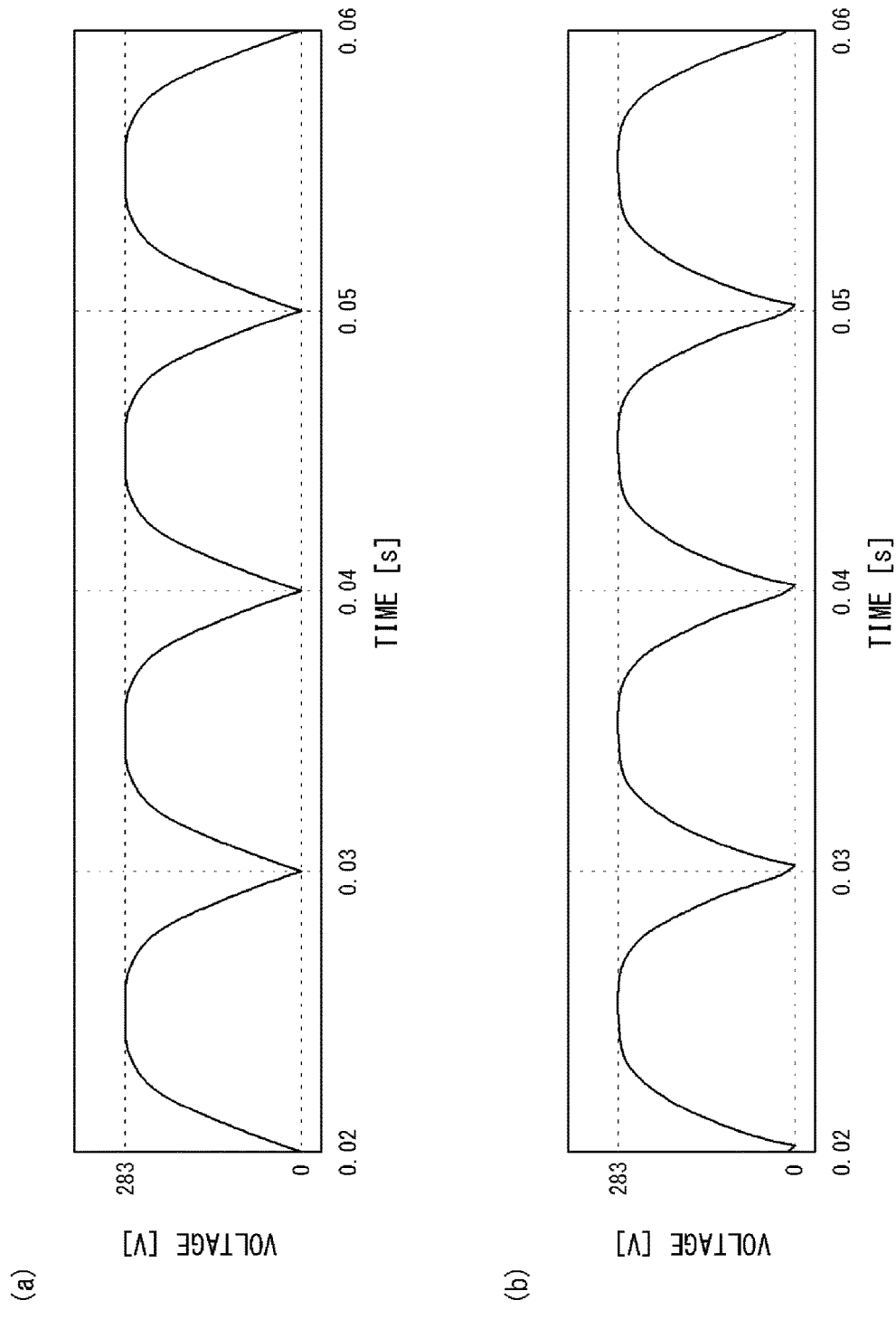
FIG. 6 shows four cycles of the command value (ideal value) for the output waveform of the first conversion unit, and four cycles of an output waveform that is actually outputted.

In FIG. 6, (a) shows four cycles of the command value (ideal value) for the output waveform of the first conversion unit 1, set as described above. The horizontal axis indicates time and the vertical axis indicates voltage. That is, this is approximate to a pulsating-current waveform obtained by full-wave rectifying the AC waveform of the AC voltage $V_{AC}$, but because the third-order harmonic is contained, the wave crest value is reduced from 327V to 283V.

In FIG. 6, (b) shows voltage of a pulsating-current waveform that actually arises between both ends of the capacitor 14. As is obvious from comparison with (a), a pulsating-current waveform almost as indicated by the command value can be obtained.

Figure 7:
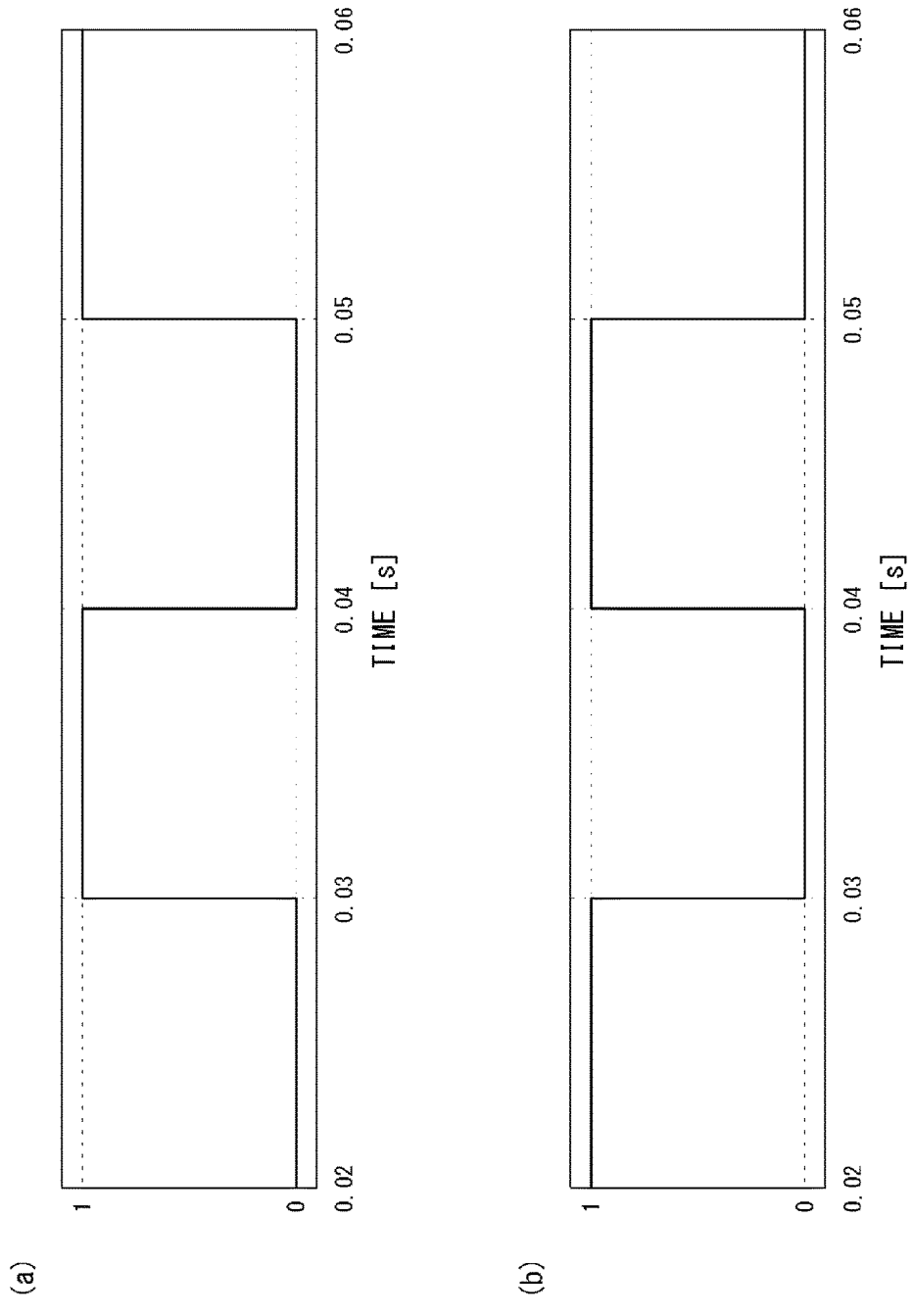
FIG. 7 shows gate drive pulses for switching elements composing a full-bridge inverter of a second conversion unit.

FIG. 7 shows gate drive pulses for the switching elements Q9 to Q12 composing the full-bridge inverter of the second conversion unit 2. In FIG. 7, (a) shows a gate drive pulse for the switching element Q9, Q12, and (b) shows a gate drive pulse for the switching element Q10, Q11. As shown in the graphs, values 1 and 0 arise alternately, whereby the polarity of the pulsating-current waveform in FIG. 6 is inverted per one cycle of the pulsating current.

FIG. 8 is graphs showing one cycle of the AC voltage $V_{AC}$ outputted as described above, in which (a) is target voltage (ideal value) and (b) is the AC voltage $V_{AC}$ actually detected by the voltage sensor 6s. Although there is slight distortion in the vicinity of zero cross, an AC waveform almost as indicated by the target is obtained.

(Summary)

As described above, in the conversion device 100, although the hardware configuration of the first conversion unit 1 is a DC/DC converter, the DC voltage is converted to, not mere DC voltage, but a pulsating-current waveform corresponding to the absolute value of the AC waveform containing a third-order harmonic. Thus, a waveform as a base of the AC waveform is generated by the first conversion unit 1. Then, the second conversion unit 2 inverts the polarity of the voltage containing the pulsating-current waveform, per one cycle, thereby converting the voltage to the target voltage of the AC waveform.

By outputting each phase voltage as described above, as compared to a case where the line-to-line voltage (400V) to the three-phase AC load 6 is supplied by a single three-phase inverter, the voltage of the DC bus $L_B$ is reduced and further the effect of reducing the wave crest value by superimposition of the third-order harmonic is obtained, whereby switching loss in the switching elements Q5 to Q12 in the conversion device 100 is reduced. In addition, iron loss in the isolation transformer 12 is also reduced.

In addition, the number of times of switching in the full-bridge inverter of the second conversion unit 2 is dramatically decreased as compared to that in the conventional inverter operation. That is, the number of times of switching is dramatically decreased (1/200) from a high frequency of, for example, about 20 kHz, to 100 Hz (for example, twice per one cycle of AC at 50 Hz). Since the second conversion unit 2 performs switching at the timing of zero cross, voltage at the time of switching is extremely low (ideally, 0V). Therefore, switching loss in the second conversion unit 2 is greatly reduced. Since the second conversion unit 2 does not perform inverter operation accompanied by high-frequency switching, an AC reactor is not needed on the output side of the second conversion unit 2, and thus power loss due to the AC reactor can be eliminated.

Owing to reduction in power loss as described above, the conversion efficiency of the conversion device 100 can be improved.

The capacitor 14 of the first conversion unit 1 only needs to smooth high-frequency voltage variation, but does not smooth the low-frequency pulsating-current waveform. Therefore, a capacitor with a low capacitance (for example, 10 μF or 22 μF) can be used.

(Three-Phase Waveform)

FIG. 9 is a waveform diagram in which (a) shows phase voltages for U, V, W outputted from the power conversion device 100P, and (b) shows line-to-line voltages for U-V, V-W, W-U applied to the three-phase AC load.

The control unit 3 controls the conversion device (first conversion device, second conversion device, third conversion device) 100 for each phase so that the phases of the AC waveforms outputted therefrom are shifted from each other by $(2/3)\pi$. Even though each phase voltage contains the third-order harmonic, the third-order harmonics are cancelled in the line-to-line voltage, and thus three-phase line-to-line voltages having phases shifted from each other by $(2/3)\pi$ and having a wave crest value of 566V (=400× $(2^{1/2})$=283×2) are obtained as in a case of phase voltages of normal sine waves.

Thus, the power conversion device 100P can apply three-phase AC voltage to the three-phase AC load 6 and supply AC power thereto.

(Second Example of Waveform)

Figure 10:
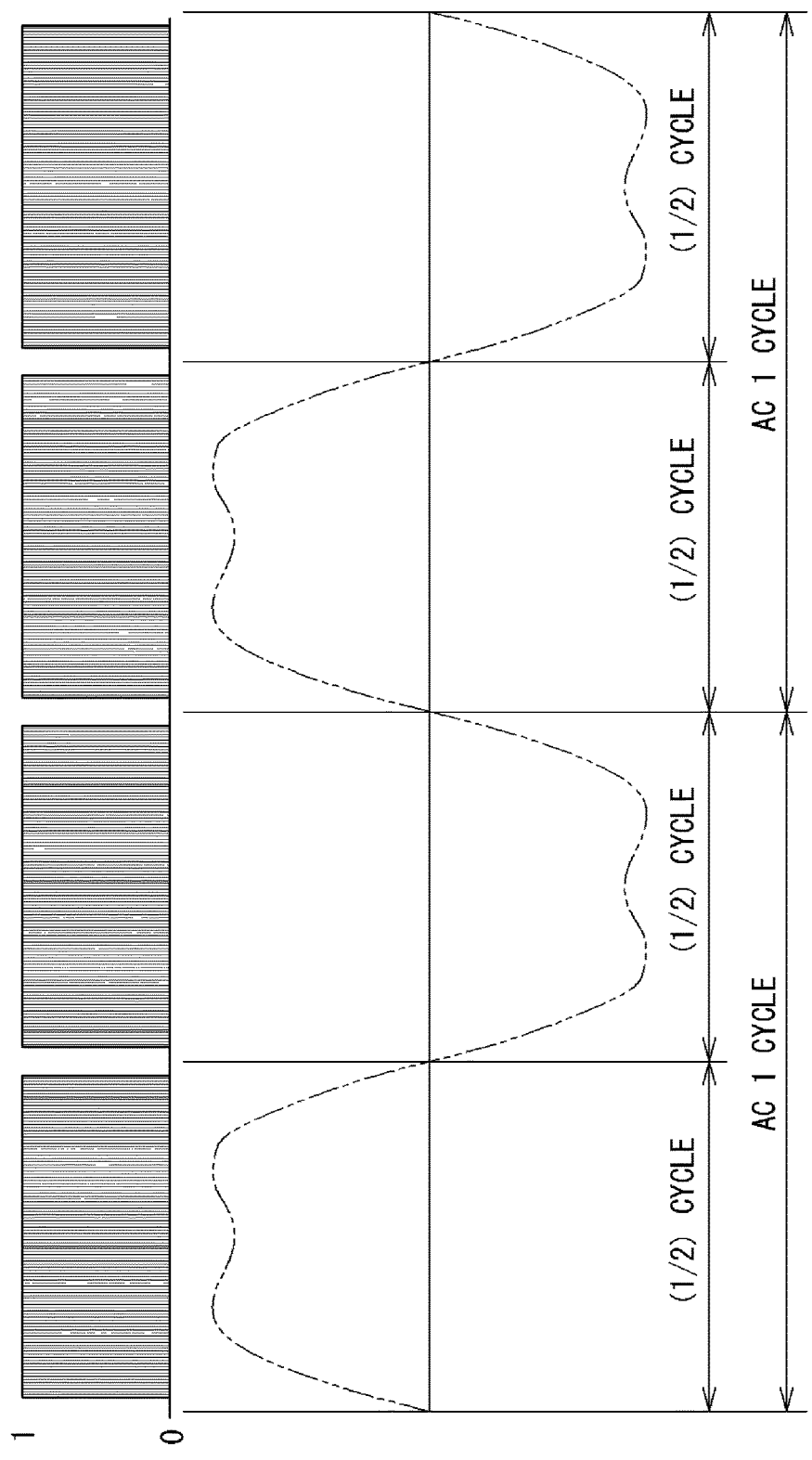
FIG. 10 is a diagram showing a gate drive pulse for the full-bridge circuit.

FIG. 10 is a diagram showing a gate drive pulse for the full-bridge circuit 11. In FIG. 10, a waveform indicated by a two-dot dashed line is AC voltage $V_{AC}$ corresponding to the target voltage. It is noted that this waveform is not a normal sine wave. Since the frequency of the gate drive pulse is much higher (for example, 20 kHz) than the frequency (50 or 60 Hz) of the AC voltage $V_{AC}$, each pulse cannot be depicted, but the pulse width becomes the broadest at the peak of the absolute value of the AC waveform, and becomes narrower as the absolute value approaches zero.

Figure 11:
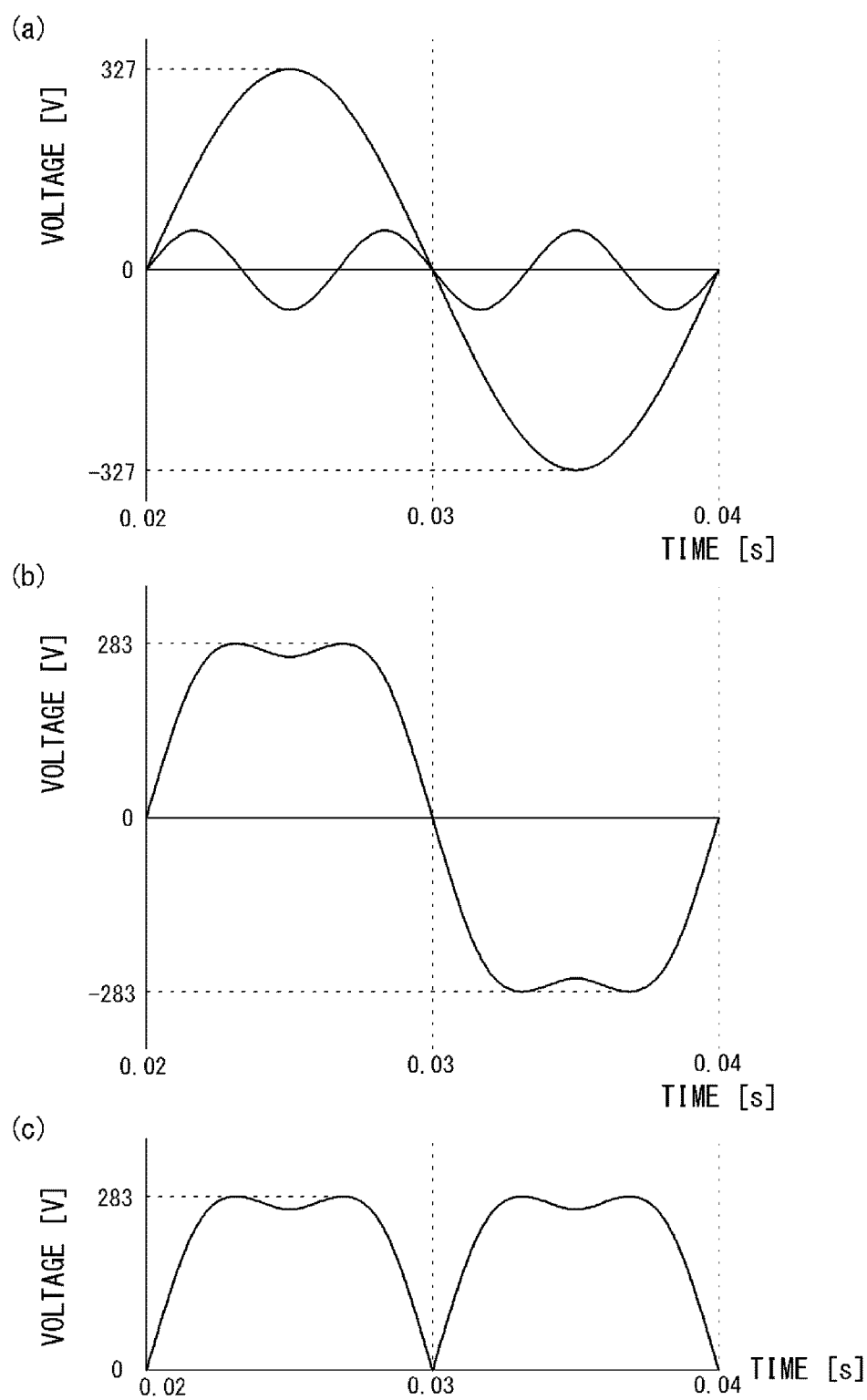
FIG. 11 is graphs showing another example of the way of generating a command value for an output waveform in the first conversion unit, in which the horizontal axis indicates time and the vertical axis indicates voltage.

FIG. 11 is graphs showing another example of the way of generating a command value for the output waveform in the first conversion unit 1. The horizontal axis indicates time and the vertical axis indicates voltage. The waveform of the command value is obtained by using, as a fundamental wave, a sine wave having a wave crest value of 327V and a commercial frequency (50 Hz, 0.02 sec per cycle) as shown in (a), and superimposing, on the fundamental wave, a third-order harmonic having a frequency three times as high as that of the fundamental wave. The amplitude of the third-order harmonic is, for example, 20% of the amplitude of the fundamental wave. By superimposing the two waveforms, an AC waveform containing a third-order harmonic as shown in (b) is obtained. The peak value (wave crest value) of this AC wave becomes, due to its waveform, lower than that of the fundamental wave shown in (a), i.e., becomes $327\times(3^{1/2})/2=283$ [V]. Then, the waveform of (c) which is the absolute value of the waveform of (b) becomes a command value for the output waveform of the first conversion unit 1.

Figure 12:
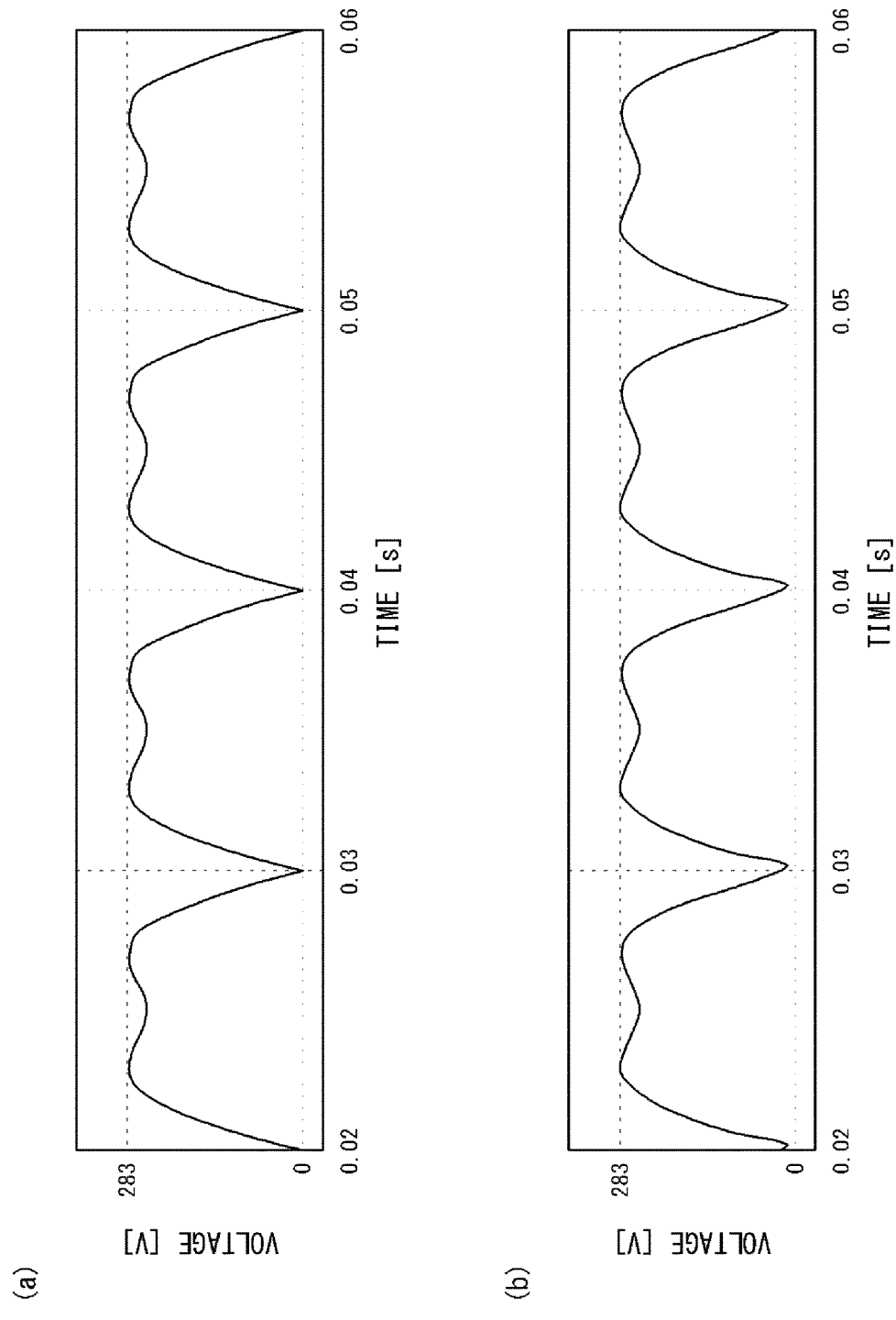
FIG. 12 is graphs in which (a) shows four cycles of the command value (ideal value) for the output waveform of the first conversion unit, and (b) shows four cycles of an output waveform that is actually outputted.

In FIG. 12, (a) shows four cycles of the command value (ideal value) for the output waveform of the first conversion unit 1, set as described above. The horizontal axis indicates time and the vertical axis indicates voltage. That is, this is approximate to a pulsating-current waveform obtained by full-wave rectifying the AC waveform of the AC voltage $V_{AC}$, but because the third-order harmonic is contained, the wave crest value is reduced from 327V to 283V.

In FIG. 12, (b) shows voltage of a pulsating-current waveform that actually arises between both ends of the capacitor 14. As is obvious from comparison with (a), a pulsating-current waveform almost as indicated by the command value can be obtained.

The switching elements Q9 to Q12 composing the full-bridge inverter 21 of the second conversion unit 2 are driven by the gate drive pulse as shown in FIG. 7, as in the first example. As a result, the polarity of the pulsating-current waveform in FIG. 12 is inverted per one cycle of the pulsating current.

FIG. 13 is graphs showing one cycle of the AC voltage $V_{AC}$ outputted as described above, in which (a) is target voltage (ideal value) and (b) is the AC voltage $V_{AC}$ actually detected by the voltage sensor 6s. Although there is slight distortion in the vicinity of zero cross, an AC waveform almost as indicated by the target is obtained.

(Summary)

As described above, in the conversion device 100, although the hardware configuration of the first conversion unit 1 is a DC/DC converter, the DC voltage is converted to, not mere DC voltage, but a pulsating-current waveform corresponding to the absolute value of the AC waveform containing a third-order harmonic. Thus, a waveform as a base of the AC waveform is generated by the first conversion unit 1. Then, the second conversion unit 2 inverts the polarity of the voltage containing the pulsating-current waveform, per one cycle, thereby converting the voltage to the target voltage of the AC waveform.

By outputting each phase voltage as described above, as compared to a case where the line-to-line voltage (400V) to the three-phase AC load 6 is supplied by a single three-phase inverter, the voltage of the DC bus $L_B$ is reduced and further the effect of reducing the wave crest value by superimposition of the third-order harmonic is obtained, whereby switching loss in the switching elements Q5 to Q12 in the conversion device 100 is reduced. In addition, iron loss in the isolation transformer 12 is also reduced.

In addition, the number of times of switching in the full-bridge inverter of the second conversion unit 2 is dramatically decreased as compared to that in the conventional inverter operation. That is, the number of times of switching is dramatically decreased (1/200) from a high frequency of, for example, about 20 kHz, to 100 Hz (for example, twice per one cycle of AC at 50 Hz). Since the second conversion unit 2 performs switching at the timing of zero cross, voltage at the time of switching is extremely low (ideally, 0V). Therefore, switching loss in the second conversion unit 2 is greatly reduced. Since the second conversion unit 2 does not perform inverter operation accompanied by high-frequency switching, an AC reactor is not needed on the output side of the second conversion unit 2, and thus power loss due to the AC reactor can be eliminated.

Owing to reduction in power loss as described above, the conversion efficiency of the conversion device 100 can be improved.

The capacitor 14 of the first conversion unit 1 only needs to smooth high-frequency voltage variation, but does not smooth the low-frequency pulsating-current waveform.

Therefore, a capacitor with a low capacitance (for example, 10 μF or 22 μF) can be used.

(Three-Phase Waveform)

FIG. 14 is a waveform diagram in which (a) shows phase voltages for U, V, W outputted from the power conversion device 100P, and (b) shows line-to-line voltages for U-V, V-W, W-U applied to the three-phase AC load.

The control unit 3 controls the conversion device (first conversion device, second conversion device, third conversion device) 100 for each phase so that the phases of the AC waveforms outputted therefrom are shifted from each other by $(2/3)\pi$. Even though each phase voltage contains the third-order harmonic, the third-order harmonics are cancelled in the line-to-line voltage, and thus three-phase line-to-line voltages having phases shifted from each other by $(2/3)\pi$ and having a wave crest value of 566V $(=400\times(2^{1/2})=283\times2)$ are obtained as in a case of phase voltages of normal sine waves.

Thus, the power conversion device 100P can apply three-phase AC voltage to the three-phase AC load 6 and supply AC power thereto.

(Supplement)

As described above, the conversion device 100 can be used also for conversion from AC to DC. However, in this case, it is preferable that an AC reactor (which is the same as an AC reactor 23 (FIG. 16) in the second embodiment described later) is interposed on an electric path from the mutual connection point between the switching elements Q9 and Q10 to the capacitor 22.

In this case, the AC reactor and the capacitor 22 form a filter circuit (low-pass filter). In FIG. 2, in a case of feeding power from the AC side, the second conversion unit 2 serves as a "rectification circuit", and the rectification circuit 13 of the first conversion unit 1 serves as an "inverter". A high-frequency component generated by the "inverter" is prevented from leaking to the AC side, owing to the presence of the filter circuit.

The full-bridge circuit 11 in this case serves as a "rectification circuit". The control unit 3 turns on the switching elements Q5 and Q8 and the switching elements Q6 and Q7 alternately at such an appropriate switching frequency that does not magnetically saturate the isolation transformer 12, thus sending power to the isolation transformer 12. Output of the isolation transformer 12 is rectified by the full-bridge circuit 11 serving as a "rectification circuit", to become DC voltage.

Second Embodiment of Three-Phase AC Power Supply Device/Power Conversion Device (Three-Phase Circuit Diagram)

Figure 15:
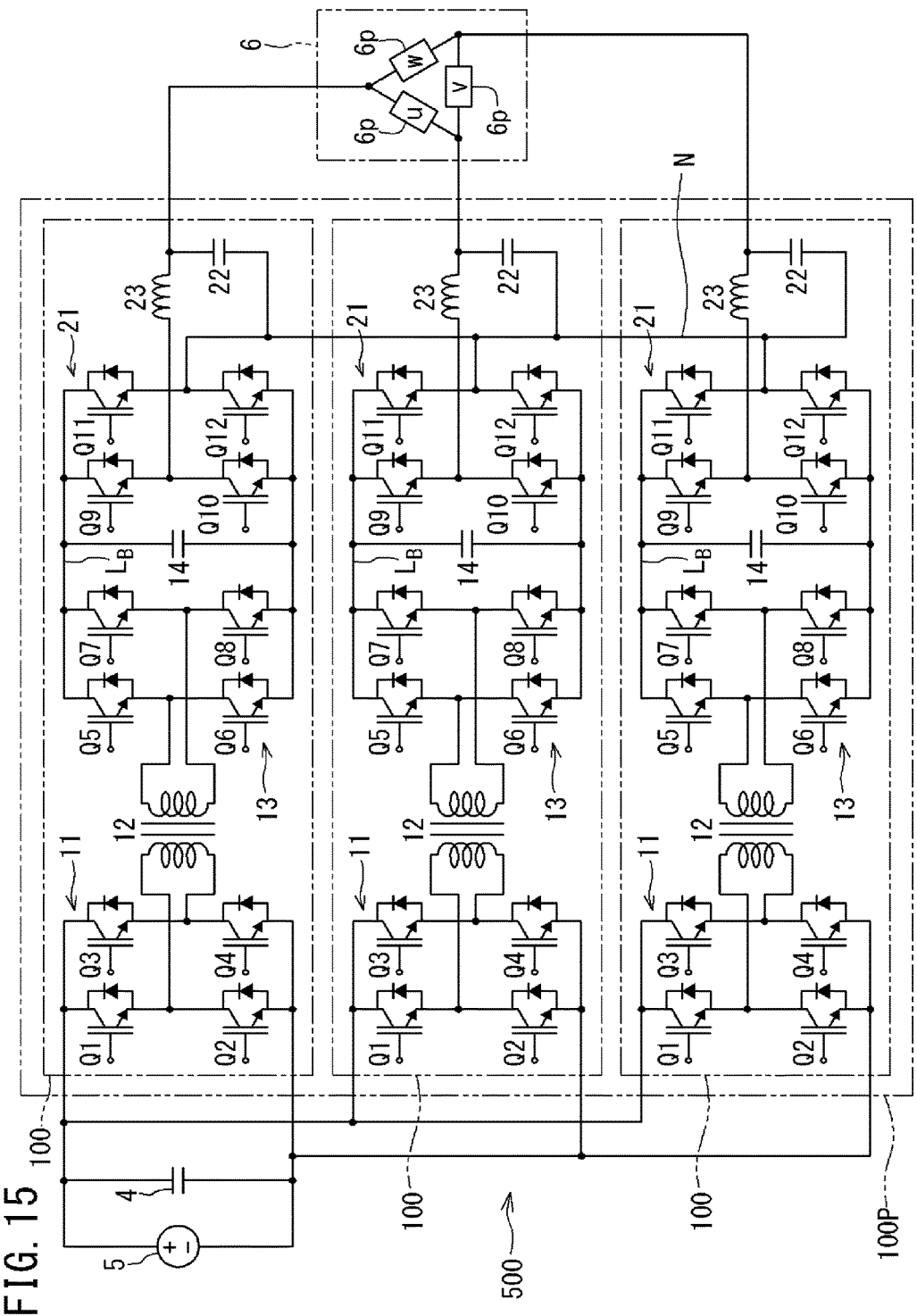
FIG. 15 is a circuit diagram showing a three-phase AC power supply device according to the second embodiment.

FIG. 15 is a circuit diagram showing a three-phase AC power supply device 500 according to the second embodiment. The three-phase AC power supply device 500 includes the power conversion device 100P, and the DC power supply 5 composed of, for example, a storage battery, and is connected to the three-phase AC load 6.

Figure 16:
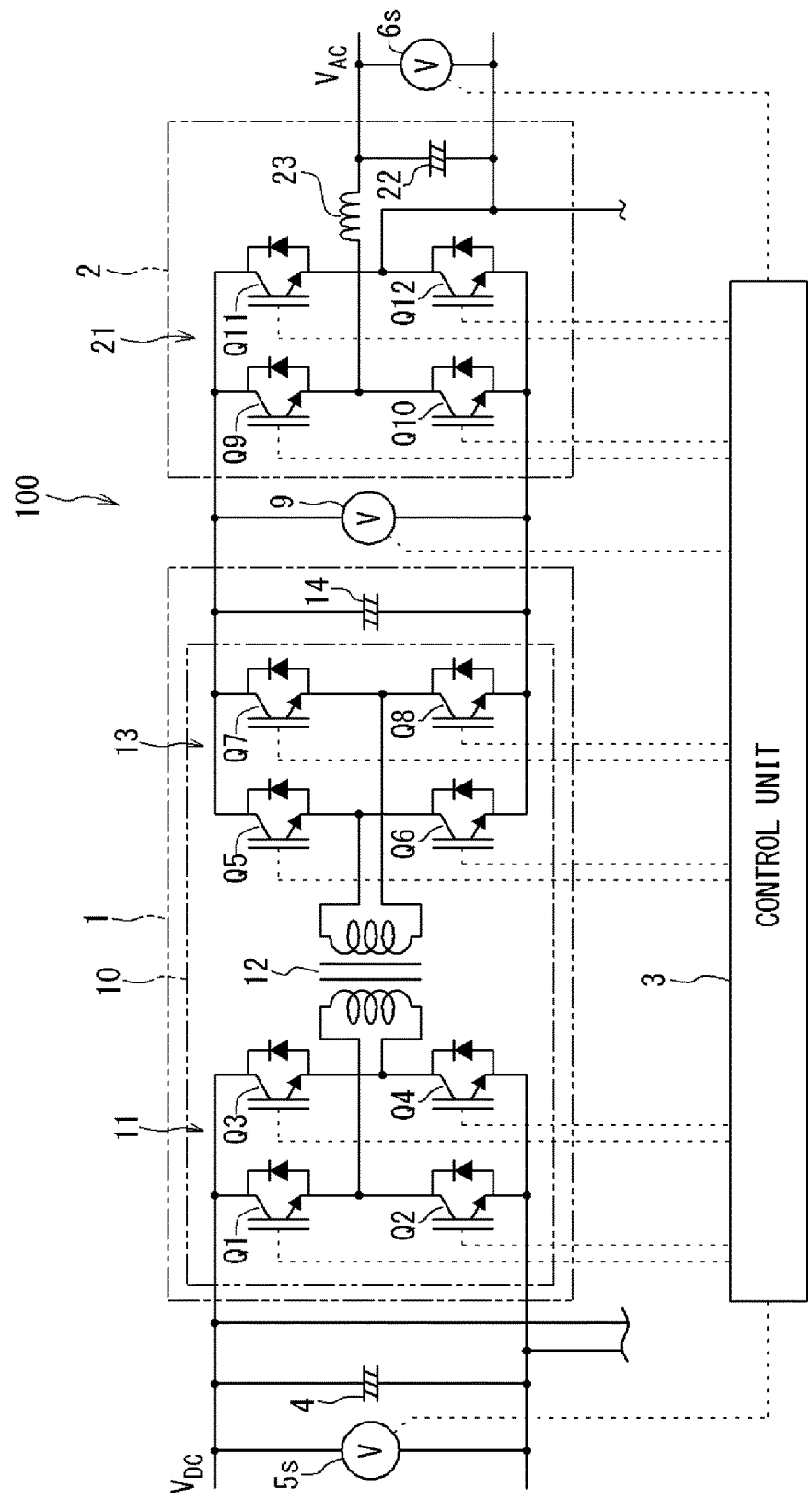
FIG. 16 is a diagram showing in more detail an internal circuit of a conversion device for one phase in FIG. 15.

FIG. 16 is a diagram showing in more detail an internal circuit of the conversion device 100 for one phase in FIG. 15.

(Single-Phase Circuit Diagram)

FIG. 16 is different from FIG. 2 in that, in FIG. 16, an AC reactor 23 is provided on the output side of the full-bridge inverter 21 in the second conversion unit 2, and a voltage sensor 9 for detecting output voltage of the first conversion unit 1 is provided. The other hardware configuration is the same. The AC reactor 23 and the capacitor 22 compose a filter circuit (low-pass filter) for removing a high-frequency component contained in output of the second conversion unit 2. Information about the voltage detected by the voltage sensor 9 is sent to the control unit 3.

(Operation of Conversion Device)

(First Example of Waveform)

Figure 17:
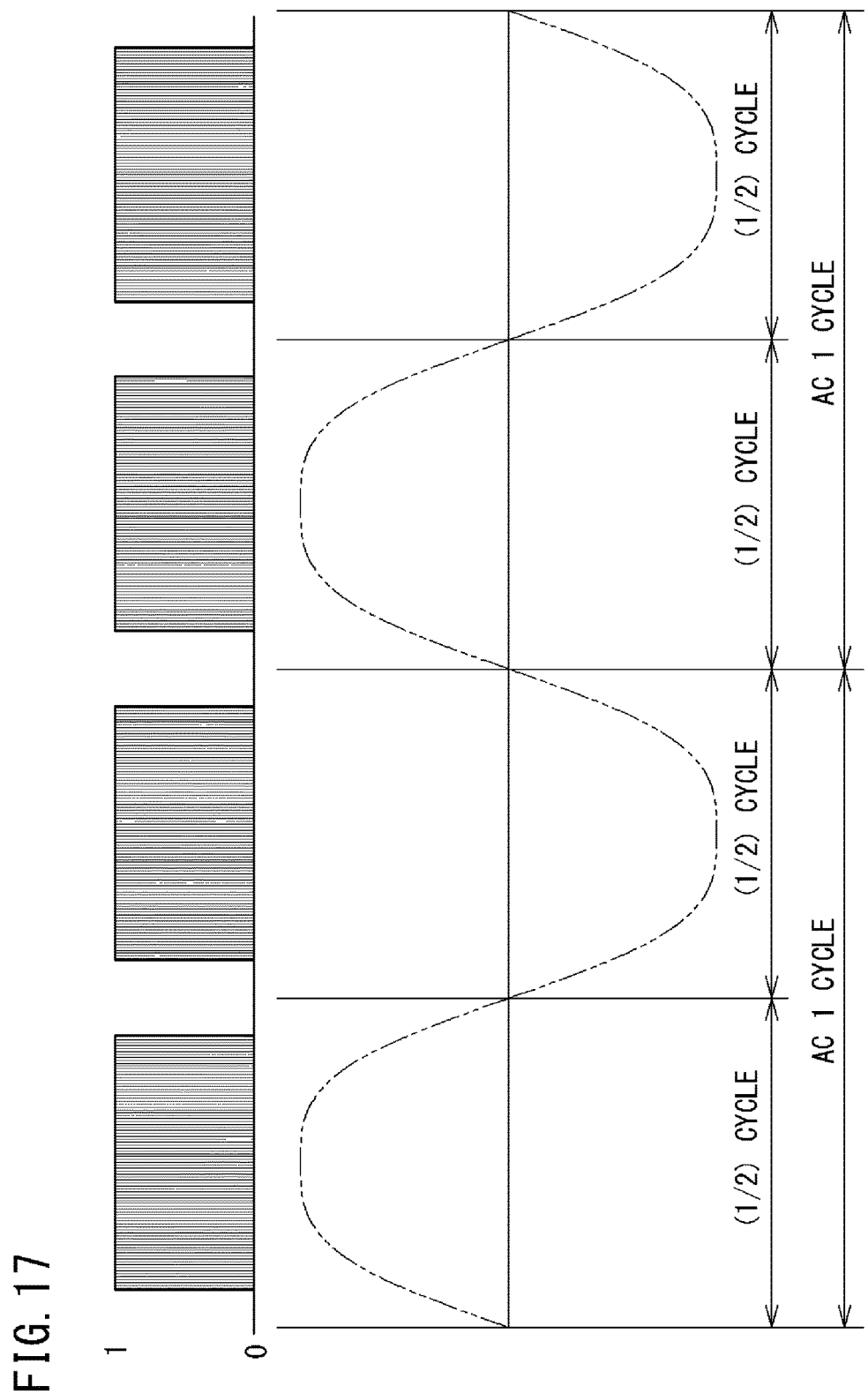
FIG. 17 is a diagram showing a gate drive pulse for a full-bridge circuit.

FIG. 17 is a diagram showing a gate drive pulse for the full-bridge circuit 11. In FIG. 17, a waveform indicated by a two-dot dashed line is AC voltage $V_{AC}$ corresponding to the target voltage. It is noted that this waveform is not a normal sine wave. Since the frequency of the gate drive pulse is much higher (for example, 20 kHz) than the frequency (50 or 60 Hz) of the AC voltage $V_{AC}$, each pulse cannot be depicted, but the pulse width becomes the broadest at the peak of the absolute value of the AC waveform, and becomes narrower as the absolute value approaches zero. A difference from FIG. 3 is that, in the vicinity of zero cross of the AC waveform, no gate drive pulse is outputted in a region wider than that in FIG. 3.

Figure 18:
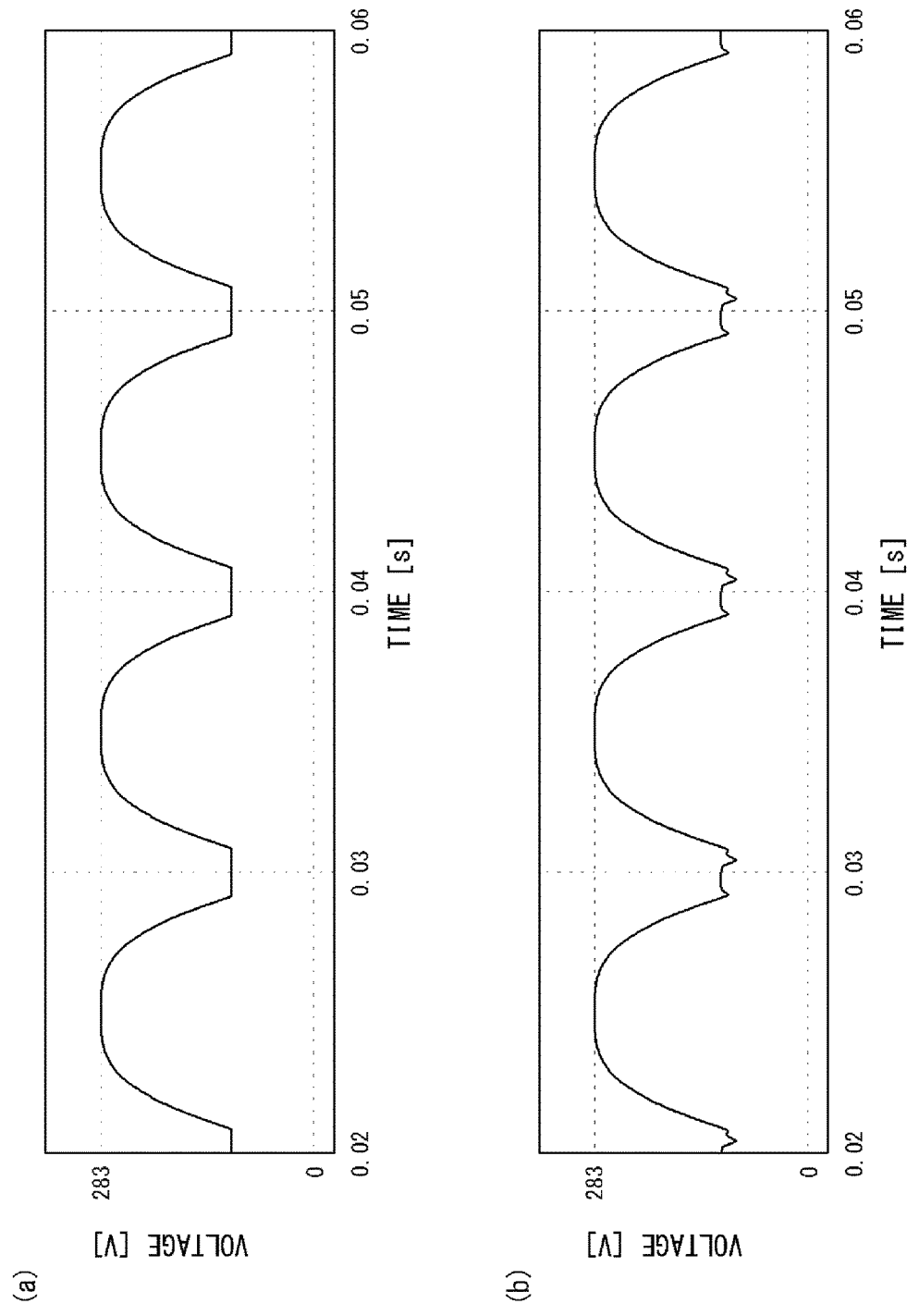
FIG. 18 is graphs in which (a) shows a command value (ideal value) for the output waveform of a first conversion unit to be obtained by the gate drive pulse in FIG. 17, and (b) shows voltage of a pulsating-current waveform that actually arises between both ends of a capacitor.

In FIG. 18, (a) shows four cycles of a command value (ideal value) for the output waveform of the first conversion unit 1 to be obtained by the gate drive pulse in FIG. 17. The horizontal axis indicates time, and the vertical axis indicates voltage. That is, this is a waveform obtained by, as described above, superimposing a third-order harmonic with an amplitude ratio of 10% onto a pulsating-current waveform (which has, however, such a shape that the lower limit part is cut) like a waveform obtained by full-wave rectifying the AC waveform of the AC voltage $V_{AC}$. In this case, the frequency of the AC voltage $V_{AC}$ corresponding to the target voltage is, for example, 50 Hz. Therefore, one cycle of the pulsating-current waveform is half of (1/50) seconds=0.02 seconds, i.e., 0.01 seconds. In this example, the wave crest value is 283V $(200\times(2^{1/2}))$.

In FIG. 18, (b) shows voltage of a pulsating-current waveform that actually arises between both ends of the capacitor 14. As is obvious from comparison with (a), a pulsating-current waveform almost as indicated by the command value can be obtained, but the waveform is slightly distorted in a period during which the voltage thereof is equal to or lower than a predetermined proportion of the wave crest value of the target voltage, for example, equal to or lower than 100V.

Figure 19:
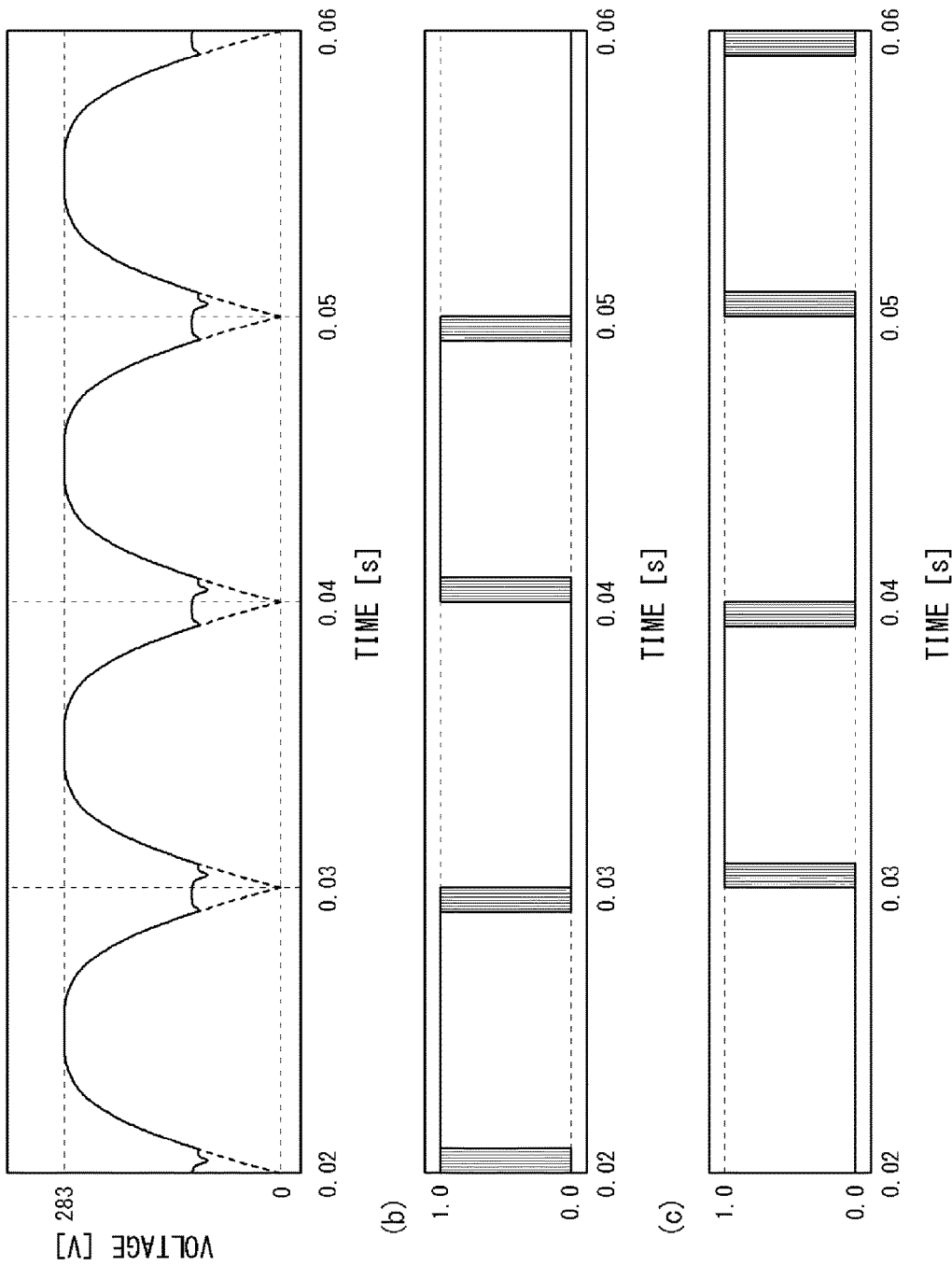
FIG. 19 is graphs in which (a) shows a graph obtained by additionally depicting the waveform of target voltage in the vicinity of zero cross by dot lines on the same graph as (b) in FIG. 18, and (b) and (c) show gate drive pulses for switching elements composing a full-bridge inverter of a second conversion unit.

In FIG. 19, (a) is a graph obtained by additionally depicting the waveform of the target voltage in the vicinity of zero cross by dot lines on the same graph as (b) in FIG. 18. In FIG. 19, (b) and (c) show gate drive pulses for the switching elements Q9 to Q12 composing the full-bridge inverter of the second conversion unit 2. That is, (b) shows the gate drive pulse for the switching element Q9, Q12, and (c) shows the gate drive pulse for the switching element Q10, Q11. In the region in which thin lines along the vertical direction are depicted in the graphs, PWM control is performed through high-frequency switching.

As shown in FIG. 19, the gate drive pulses in (b) and (c) take values 1 and 0 alternately. Thus, the pulsating-current waveform in (a) is inverted per one cycle of the pulsating current. Regarding control in (b), i.e., control for the switching elements Q9 and Q12, when the voltage shown in (a) outputted from the first conversion unit 1 is equal to or lower than, for example, 100V, the control unit 3 causes the switching elements Q9 and Q12 to perform high-frequency switching, to perform inverter operation. Thus, voltage is outputted from the second conversion unit 2 so as to approach the target voltage in the vicinity of zero cross. Also in (c), similarly, when the voltage outputted from the first conversion unit 1 is equal to or lower than, for example, 100V, the control unit 3 causes the switching elements Q10 and Q11 to perform high-frequency switching, to perform inverter operation. Thus, voltage is outputted from the second conversion unit 2 so as to approach the target voltage in the vicinity of zero cross.

Figure 20:
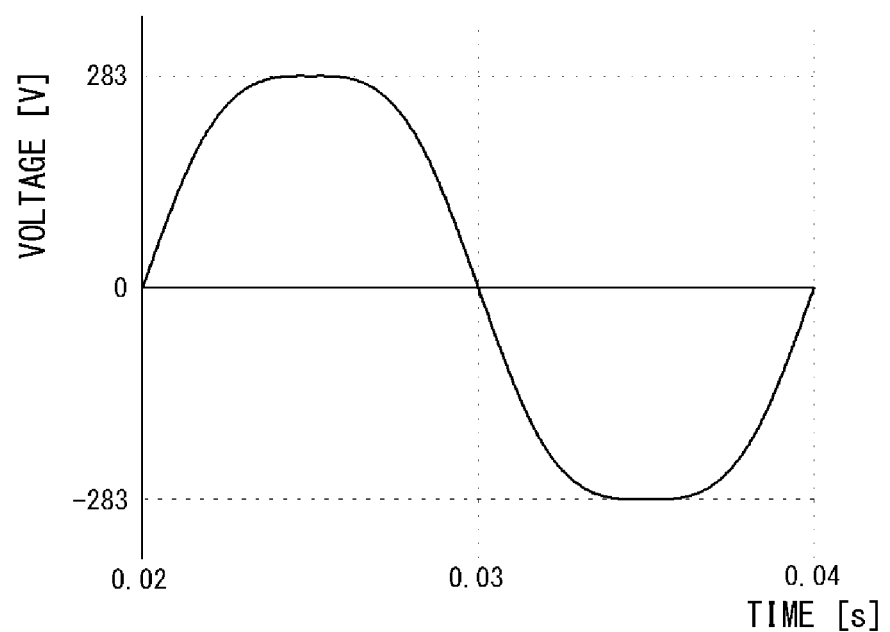
FIG. 20 is a graph showing AC voltage $V_{AC}$ outputted from the second conversion unit via a filter circuit composed of an AC reactor and a capacitor.

FIG. 20 is a graph showing the AC voltage $V_{AC}$ outputted from the second conversion unit 2 via the filter circuit composed of the AC reactor 23 and the capacitor 22. As shown in FIG. 20, an almost ideal AC waveform as indicated by the target voltage is obtained without distortion in the vicinity of zero cross.

It is noted that, preferably, the predetermined proportion for causing the second conversion unit 2 to perform inverter operation is 18% to 35%.

In this case, it is possible to prevent distortion of the waveform in the vicinity of zero cross, and also, sufficiently obtain the effect of loss reduction. For example, if the "predetermined proportion" is lower than 18%, there is a possibility that slight distortion is left in the vicinity of zero cross. If the "predetermined proportion" is higher than 35%, the period during which the second conversion unit 2 performs high-frequency inverter operation is prolonged, and the effect of loss reduction is decreased by an amount corresponding to the prolonged period.

(Three-Phase Waveform)

The generation of the three-phase waveform is the same as in FIG. 9, and thus the description thereof is omitted here.

(Second Example of Waveform)

Figure 21:
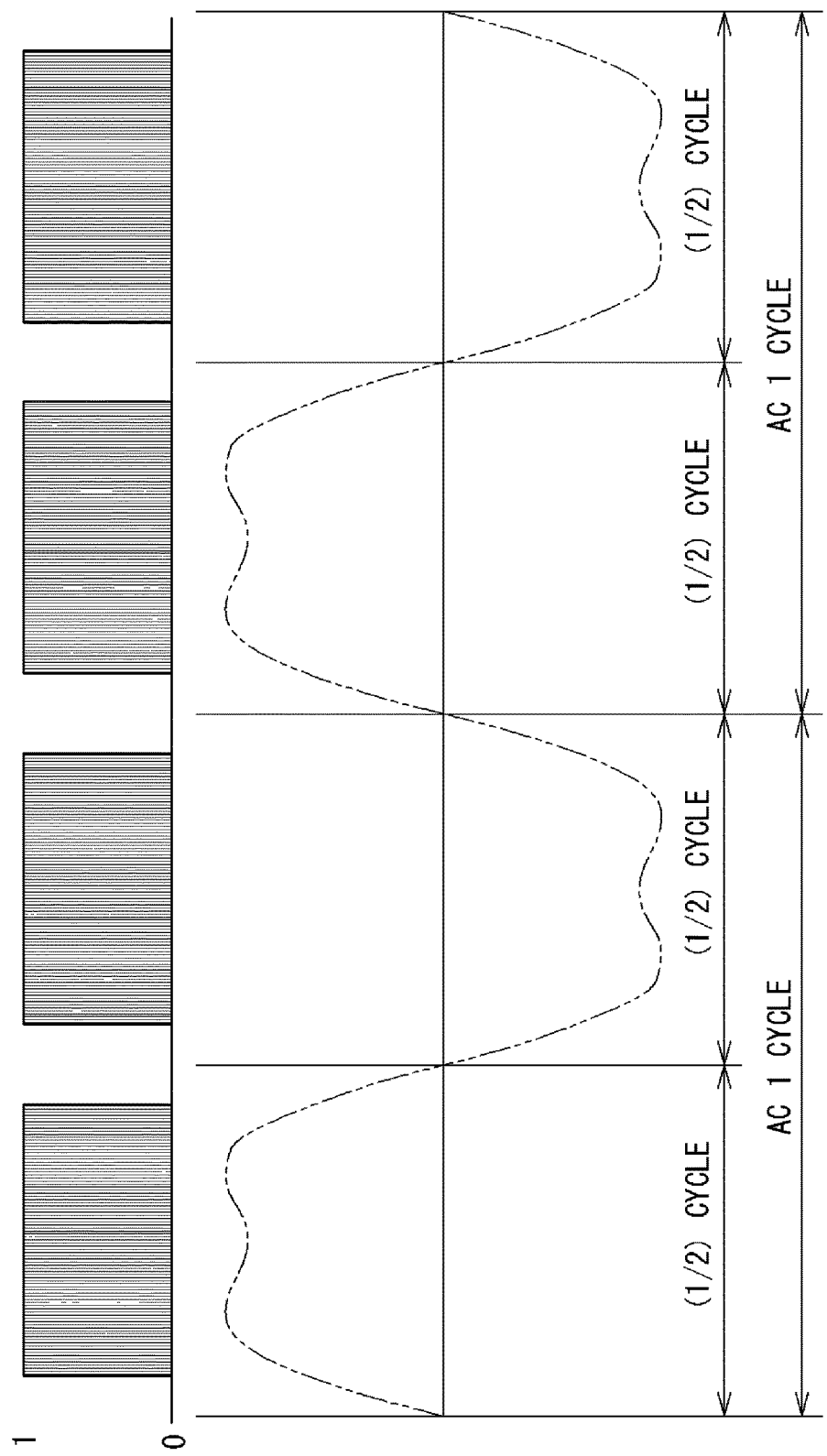
FIG. 21 is a diagram showing a gate drive pulse for the full-bridge circuit.

FIG. 21 is a diagram showing a gate drive pulse for the full-bridge circuit 11. In FIG. 21, a waveform indicated by a two-dot dashed line is AC voltage $V_{AC}$ corresponding to the target voltage. It is noted that this waveform is not a normal sine wave. Since the frequency of the gate drive pulse is much higher (for example, 20 kHz) than the frequency (50 or 60 Hz) of the AC voltage $V_{AC}$, each pulse cannot be depicted, but the pulse width becomes the broadest at the peak of the absolute value of the AC waveform, and becomes narrower as the absolute value approaches zero. A difference from FIG. 10 is that, in the vicinity of zero cross of the AC waveform, no gate drive pulse is outputted in a region wider than that in FIG. 10.

Figure 22:
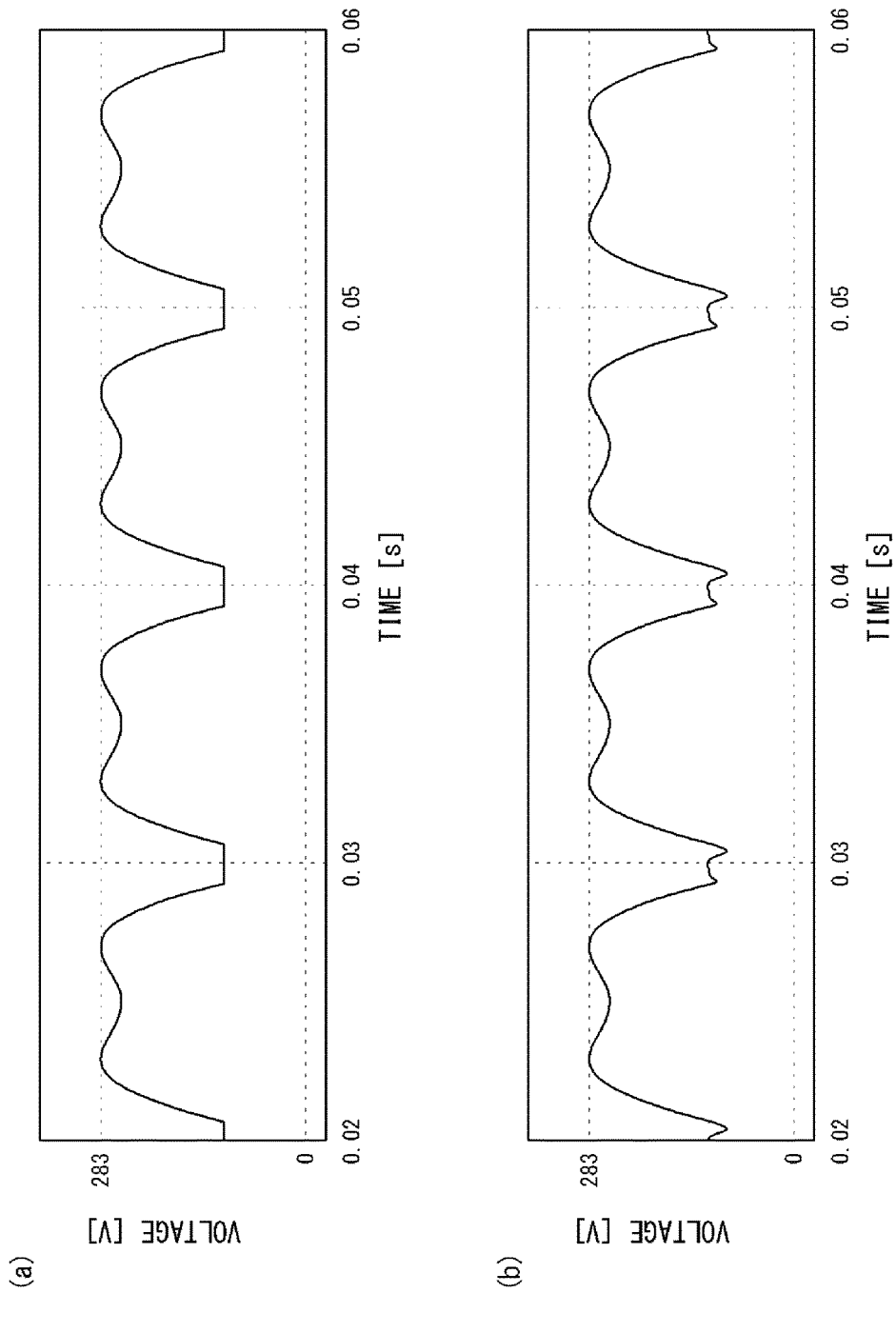
FIG. 22 is graphs in which (a) shows another example of the command value (ideal value) for the output waveform of the first conversion unit to be obtained by the gate drive pulse in FIG. 17, and (b) shows voltage of a pulsating-current waveform that actually arises between both ends of the capacitor.

In FIG. 22, (a) shows another example of a command value (ideal value) for the output waveform of the first conversion unit 1 to be obtained by the gate drive pulse in FIG. 21. The horizontal axis indicates time, and the vertical axis indicates voltage. That is, this is a waveform obtained by, as described above, superimposing a third-order harmonic with an amplitude ratio of 20% onto a pulsating-current waveform (which has, however, such a shape that the lower limit part is cut) like a waveform obtained by full-wave rectifying the AC waveform of the AC voltage $V_{AC}$. In this case, the frequency of the AC voltage $V_{AC}$ corresponding to the target voltage is, for example, 50 Hz. Therefore, one cycle of the pulsating-current waveform is half of (1/50) seconds=0.02 seconds, i.e., 0.01 seconds. In this example, the wave crest value is 283V ($200 \times (2^{1/2})$).

In FIG. 22, (b) shows voltage of a pulsating-current waveform that actually arises between both ends of the capacitor 14. As is obvious from comparison with (a), a pulsating-current waveform almost as indicated by the command value can be obtained, but the waveform is slightly distorted in a period during which the voltage thereof is equal to or lower than a predetermined proportion of the wave crest value of the target voltage, for example, equal to or lower than 100V.

Accordingly, the same processing as in FIG. 19 is performed, and when the voltage is equal to or lower than, for example, 100V, the switching elements Q9, Q12 and the switching elements Q10, Q11 are caused to perform high-frequency switching, to perform inverter operation. Thus, voltage is outputted from the second conversion unit 2 so as to approach the target voltage in the vicinity of zero cross.

Figure 23:
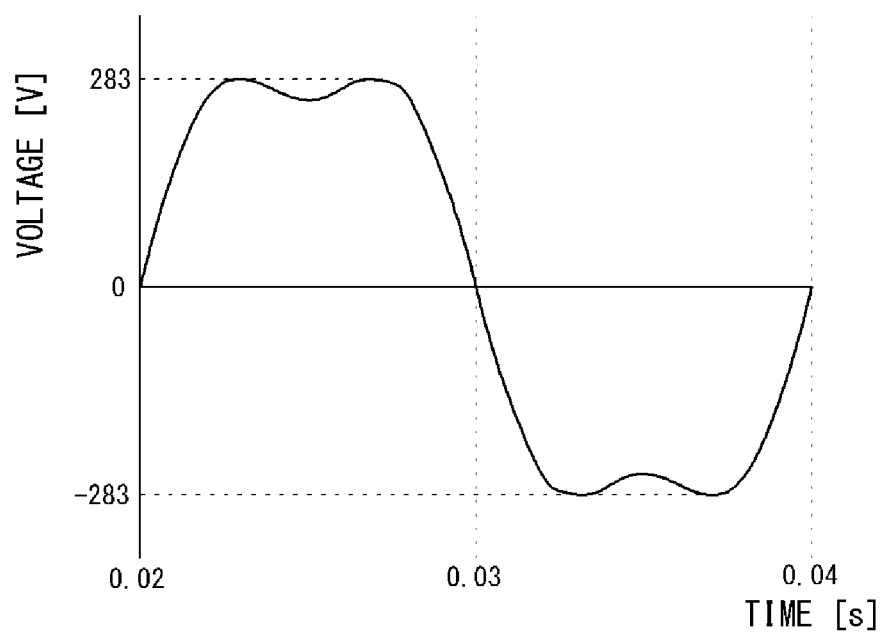
FIG. 23 is a graph showing AC voltage $V_{AC}$ outputted from the second conversion unit via the filter circuit composed of an AC reactor and a capacitor.

FIG. 23 is a graph showing the AC voltage $V_{AC}$ outputted from the second conversion unit 2 via the filter circuit composed of the AC reactor 23 and the capacitor 22. As shown in FIG. 23, an almost ideal AC waveform as indicated by the target voltage is obtained without distortion in the vicinity of zero cross.

(Three-Phase Waveform)

The generation of the three-phase waveform is the same as in FIG. 14, and thus the description thereof is omitted here.

(Summary)

As described above, in the conversion device 100 of the second embodiment, although the hardware configuration of the first conversion unit 1 is a DC/DC converter, the DC voltage is converted to, not mere DC voltage, but a pulsating-current waveform (except for the vicinity of zero cross) corresponding to the absolute value of the AC waveform containing a third-order harmonic. Thus, a waveform as a base of the AC waveform is mainly generated by the first conversion unit 1. In addition, the second conversion unit 2 inverts the polarity of the voltage containing the pulsating-current waveform outputted from the first conversion unit 1, per one cycle, thereby converting the voltage to the target voltage of the AC waveform. Further, the second conversion unit 2 performs inverter operation only for the vicinity of zero cross, to generate an AC waveform in the vicinity of zero cross, which is not generated by the first conversion unit 1, and outputs the AC waveform.

By outputting each phase voltage as described above, as compared to a case where the line-to-line voltage (400V) to the three-phase AC load 6 is supplied by a single three-phase inverter, the voltage of the DC bus $L_B$ is reduced and further the effect of reducing the wave crest value by superimposition of the third-order harmonic is obtained, whereby switching loss in the switching elements Q5 to Q12 in the conversion device 100 is reduced. In addition, iron loss in the isolation transformer 12 is also reduced.

In addition, in the vicinity of zero cross of the target voltage, the second conversion unit 2 contributes to generation of the AC waveform, and in the other region, the first conversion unit 1 contributes to generation of the AC waveform. In a case where a pulsating-current waveform in the entire region is generated by only the first conversion unit 1, the waveform in the vicinity of zero cross might be distorted. However, by locally using inverter operation of the second conversion unit 2, such distortion of the waveform is prevented, and output of a smoother AC waveform can be obtained.

Since the period during which the second conversion unit 2 is caused to perform inverter operation is short, loss is much smaller than in the conventional inverter operation. In addition, loss due to the AC reactor 23 is also smaller than in the conventional inverter operation. Further, the feature that the voltage during the period in the vicinity of zero cross in which inverter operation is performed is comparatively low, also contributes to reduction in loss due to switching and loss due to the AC reactor.

Owing to the reduction in loss as described above, the conversion efficiency of the conversion device 100 can be improved, and in addition, output of a smoother AC waveform can be obtained.

It is noted that the criterion for determining the period during which the second conversion unit 2 is caused to perform inverter operation at a high frequency is the same as in the first example.

Figure 24:
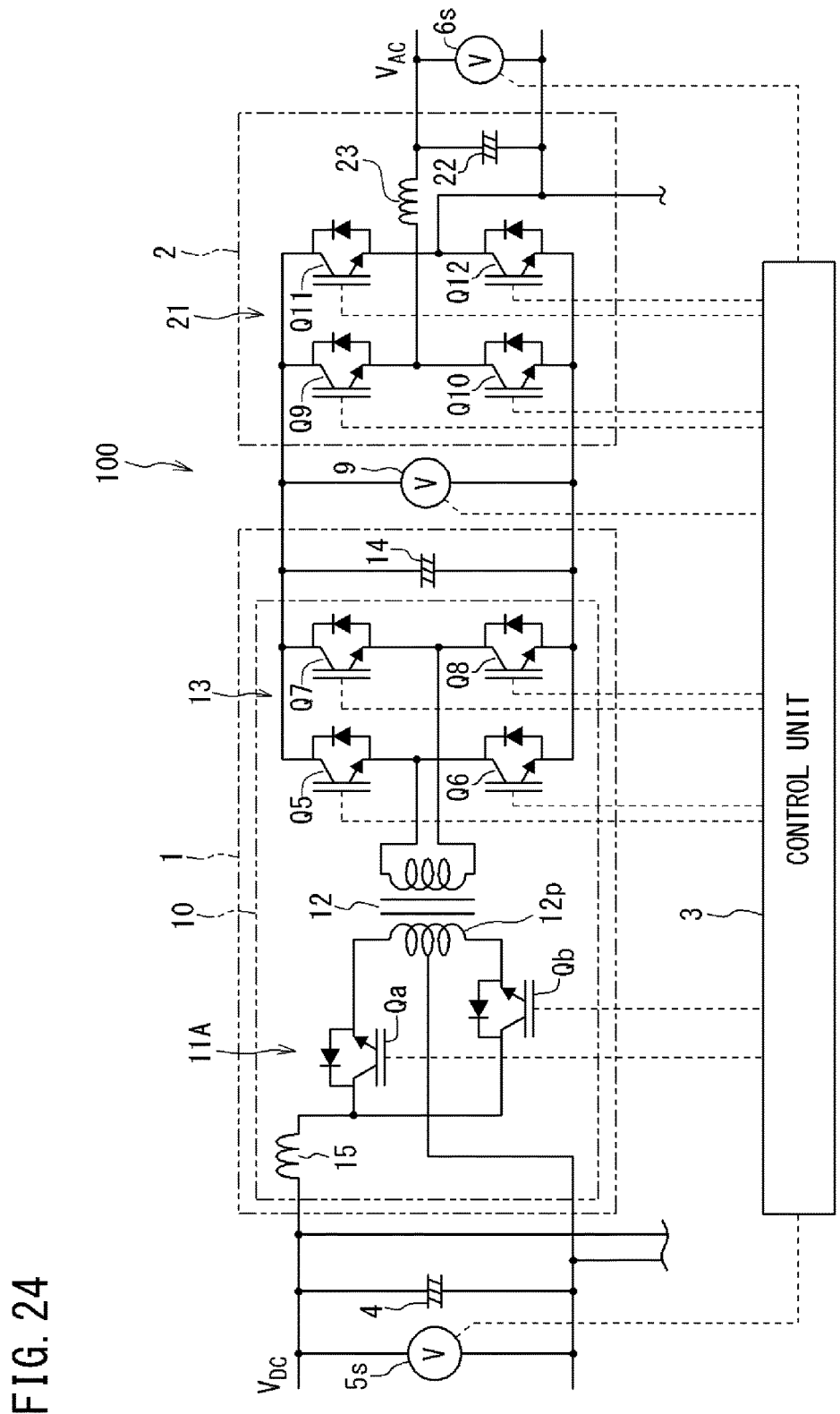
FIG. 24 is a circuit diagram of a conversion device for one phase in a three-phase AC power supply device and a power conversion device according to the third embodiment.
Figure 25:
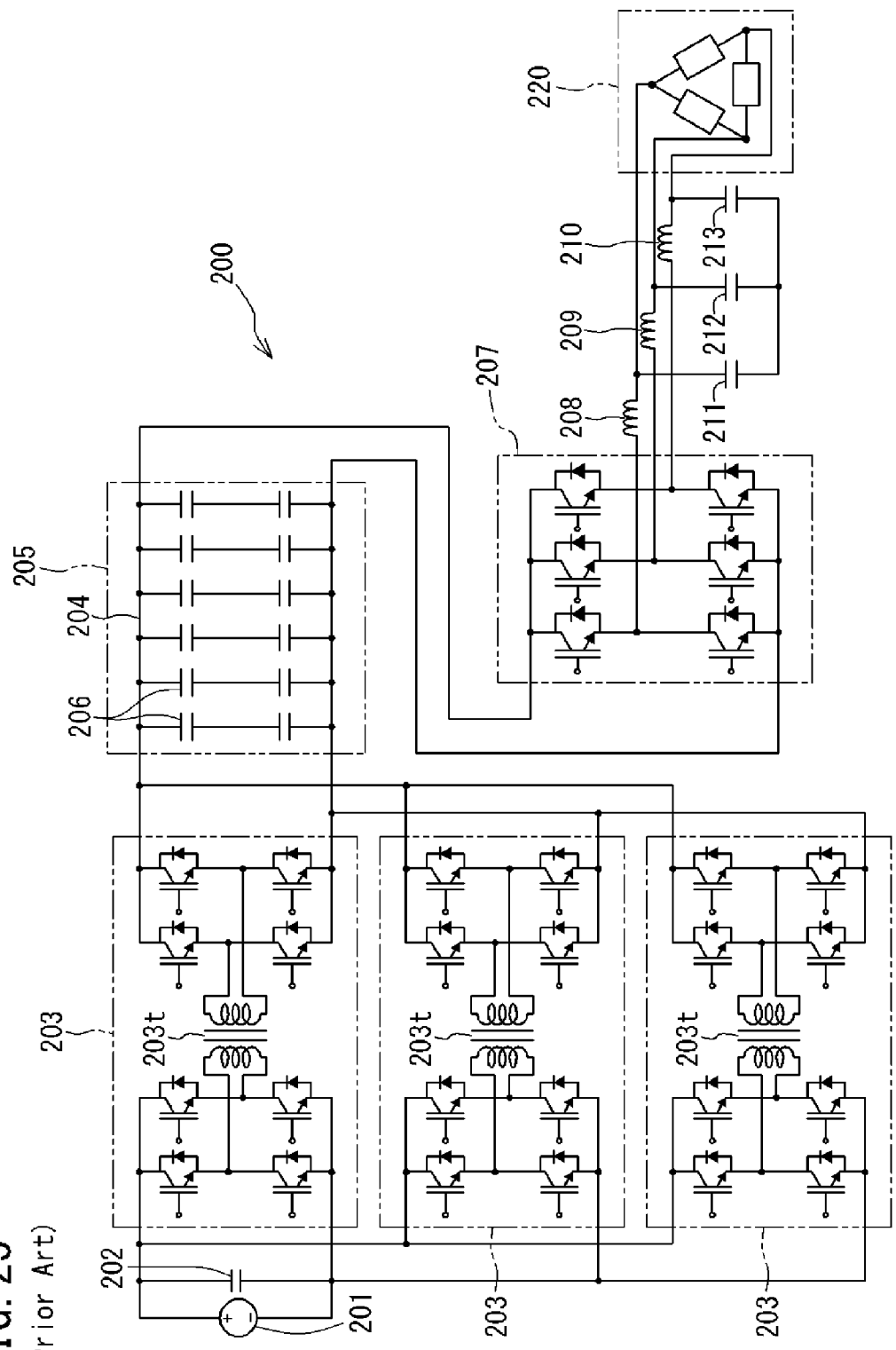
FIG. 25 is an example of a circuit diagram of a conventional power conversion device used in a case of supplying power from a DC power supply to a three-phase AC load.

Third Embodiment of Three-Phase AC Power Supply Device/Power Conversion Device FIG. 24 is a circuit diagram of a conversion device 100 for one phase in a three-phase AC power supply device and a power conversion device according to the third embodiment. Here, a diagram corresponding to FIG. 15 is omitted. That is, the three-phase AC power supply device and the power conversion device according to the third embodiment are obtained by replacing the conversion devices 100 in FIG. 15 with the conversion devices 100 in FIG. 24.

In FIG. 24, a difference from FIG. 16 (second embodiment) is that a winding 12p on the primary side (left side in FIG. 24) of the isolation transformer 12 is provided with a center tap, and a part corresponding to the full-bridge circuit 11 in FIG. 16 is a push-pull circuit 11A using the center tap. The push-pull circuit 11A includes a DC reactor 15 and switching elements Qa and Qb, which are connected as shown in FIG. 24. The switching elements Qa and Qb are subjected to PWM control by the control unit 3, and during operation of the push-pull circuit 11A, when one of the switching elements Qa and Qb is ON, the other one is OFF.

In FIG. 24, current due to the DC voltage $V_{DC}$ passes from the DC reactor 15 through one of the switching elements Qa and Qb that is turned on, and then flows into the isolation transformer 12 and flows out from the center tap. By repeatedly turning on and off the switching elements Qa and Qb alternately, the isolation transformer 12 can perform voltage transformation. By performing PWM control of the gate drive pulses for the switching elements Qa and Qb, the same function as that of the first conversion unit 1 in the second embodiment can be achieved.

That is, a command value (ideal value) for the output waveform of the first conversion unit 1 in the third embodiment is shown in (a) of FIG. 18 as in the second embodiment.

In addition, the gate drive pulse for the switching element Q9, Q12 composing the full-bridge inverter 21 of the second conversion unit 2, and the gate drive pulse for the switching element Q10, Q11 composing the full-bridge inverter 21 of the second conversion unit 2, are respectively shown in (b) and (c) of FIG. 19 as in the second embodiment.

Thus, as in the second embodiment, an AC waveform almost as indicated by the target voltage is obtained as shown in FIG. 20.

As described above, the conversion device 100 of the third embodiment can realize the same function as in the second embodiment, and can obtain output of a smooth AC waveform. In the push-pull circuit 11A, the number of switching elements is decreased as compared to that in the full-bridge circuit 11 (FIG. 16) of the second embodiment, and therefore, switching loss is reduced by an amount corresponding to the decrease in the number of switching elements.

<<Others>>

In the above embodiments, a case where the power conversion device 100P is connected to the three-phase AC load 6 has been described. However, the power conversion device 100P may be connected to a single-phase load or a power grid.

The conversion devices 100 of the first to third embodiments can be widely used for a power supply system (mainly for business purpose), a stand-alone power supply, a UPS, and the like for supplying AC power from a DC power supply such as a storage battery.

In FIG. 1 or FIG. 15, the configuration in which DC voltage is inputted from the common DC power supply 5 to the three conversion devices 100 has been shown. Such a feature that a common DC power supply can be used is also an advantage of the conversion device 100 using the isolation transformer 12. However, without limitation to usage of a common DC power supply, DC power supplies may be provided for the plurality of conversion devices individually.

It is noted that the embodiments disclosed herein are merely illustrative in all aspects and should not be recognized as being restrictive. The scope of the present invention is defined by the scope of the claims and is intended to include meaning equivalent to the scope of the claims and all modifications within the scope.

REFERENCE SIGNS LIST 1 first conversion unit
2 second conversion unit
3 control unit
4 capacitor
5 DC power supply
5s voltage sensor
6 three-phase AC load
6p phase load
6s voltage sensor
9 voltage sensor
10 DC/DC converter
11 full-bridge circuit
11A push-pull circuit
12 isolation transformer
12p primary-side winding
13 rectification circuit
14 capacitor
15 DC reactor
21 full-bridge inverter
22 capacitor
23 AC reactor
100 conversion device
100P power conversion device
200 power conversion device
201 DC power supply
202 capacitor
203 step-up circuit
203t isolation transformer
204 DC bus
205 smoothing circuit
206 capacitor
207 three-phase inverter circuit
208 to 210 AC reactor
211 to 213 capacitor
220 three-phase AC load
500 three-phase AC power supply device
$L_B$ DC bus
N neutral point
Q1 to Q12, Qa, Qb switching element

The invention claimed is:

1. A power conversion device for converting a DC voltage inputted from a DC power supply, to a three-phase AC voltage, the power conversion device comprising:
a first-phase conversion device configured to convert the DC voltage inputted from the DC power supply, to a voltage having an AC waveform to be outputted to a first phase with respect to a neutral point of three-phase AC;
a second-phase conversion device configured to convert the DC voltage inputted from the DC power supply, to a voltage having an AC waveform to be outputted to a second phase with respect to the neutral point;
a third-phase conversion device configured to convert the DC voltage inputted from the DC power supply, to a voltage having an AC waveform to be outputted to a third phase with respect to the neutral point; and
a control unit configured to control the first-phase conversion device, the second-phase conversion device, and the third-phase conversion device, wherein
each of the first-phase conversion device, the second-phase conversion device, and the third-phase conversion device includes:
a first conversion unit having a DC/DC converter including an isolation transformer, and a smoothing capacitor, the first conversion unit being configured to, by the control unit controlling the DC/DC converter, convert the inputted DC voltage to a voltage containing a pulsating-current waveform corresponding to an absolute value of a voltage obtained by superimposing a third-order harmonic on a fundamental wave as the AC waveform to be outputted; and
a second conversion unit provided at a stage subsequent to the first conversion unit and having a full-bridge inverter, the second conversion unit being configured to, by the control unit controlling the full-bridge inverter, invert a polarity of the voltage containing the pulsating-current waveform, per one cycle, thereby converting the voltage to a voltage having the AC waveform.

2. The power conversion device according to claim 1, wherein
the first conversion unit converts the DC voltage to the voltage having the pulsating-current waveform consecutively.

3. The power conversion device according to claim 1, wherein
during a period in which the voltage outputted from the first conversion unit is equal to or lower than a predetermined proportion of a wave crest value of the pulsating-current waveform, the control unit causes the full-bridge inverter to perform inverter operation at a high frequency, thereby generating the voltage having the AC waveform in the period.

4. The power conversion device according to claim 3, wherein
the predetermined proportion is 18% to 35%.

5. The power conversion device according to claim 1, wherein
the capacitor has such a capacitance that allows a high-frequency voltage variation due to switching in the first conversion unit to be smoothed but does not allow the pulsating-current waveform to be smoothed.

6. A three-phase AC power supply device comprising:
a DC power supply;
a first-phase conversion device configured to convert a DC voltage inputted from the DC power supply, to a voltage having an AC waveform to be outputted to a first phase with respect to a neutral point of three-phase AC;
a second-phase conversion device configured to convert DC voltage inputted from the DC power supply, to a voltage having an AC waveform to be outputted to a second phase with respect to the neutral point;
a third-phase conversion device configured to convert DC voltage inputted from the DC power supply, to a voltage having an AC waveform to be outputted to a third phase with respect to the neutral point; and
a control unit configured to control the first-phase conversion device, the second-phase conversion device, and the third-phase conversion device, wherein
each of the first-phase conversion device, the second-phase conversion device, and the third-phase conversion device includes:
a first conversion unit having a DC/DC converter including an isolation transformer, and a smoothing capacitor, the first conversion unit being configured to, by the control unit controlling the DC/DC converter, convert the inputted DC voltage to a voltage containing a pulsating-current waveform corresponding to an absolute value of a voltage obtained by superimposing a third-order harmonic on a fundamental wave as the AC waveform to be outputted; and
a second conversion unit provided at a stage subsequent to the first conversion unit and having a full-bridge inverter, the second conversion unit being configured to, by the control unit controlling the full-bridge inverter, invert a polarity of the voltage containing the pulsating-current waveform, per one cycle, thereby converting the voltage containing the pulsating-current to a voltage having the AC waveform.

7. The power conversion device according to claim 2, wherein
the capacitor has such a capacitance that allows a high-frequency voltage variation due to switching in the first conversion unit to be smoothed but does not allow the pulsating-current waveform to be smoothed.

8. The power conversion device according to claim 3, wherein
the capacitor has such a capacitance that allows a high-frequency voltage variation due to switching in the first conversion unit to be smoothed but does not allow the pulsating-current waveform to be smoothed.

9. The power conversion device according to claim 4, wherein
the capacitor has such a capacitance that allows a high-frequency voltage variation due to switching in the first conversion unit to be smoothed but does not allow the pulsating-current waveform to be smoothed.

* * * * *